(12) United States Patent
Hayakawa et al.

(10) Patent No.: US 7,703,333 B2
(45) Date of Patent: Apr. 27, 2010

(54) DEFORMATION SENSOR

(75) Inventors: Tomonori Hayakawa, Komaki (JP); Yuuki Saitou, Komaki (JP); Kazunobu Hashimoto, Nagoya (JP); Rentaro Kato, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 11/896,904

(22) Filed: Sep. 6, 2007

(65) Prior Publication Data
US 2008/0066564 A1 Mar. 20, 2008

(30) Foreign Application Priority Data
Sep. 15, 2006 (JP) .............................. 2006-251386

(51) Int. Cl.
*G01N 3/20* (2006.01)
(52) U.S. Cl. .......................................... 73/849; 73/777
(58) Field of Classification Search ............ 73/760–860
See application file for complete search history.

(56) References Cited

U.S. PATENT DOCUMENTS

| | | | |
|---|---|---|---|
| 3,806,471 A | | 4/1974 | Mitchell |
| 3,814,998 A * | | 6/1974 | Thoma et al. ............. 361/283.4 |
| 4,503,416 A | | 3/1985 | Kim |
| 5,090,246 A * | | 2/1992 | Colla et al. ................... 73/718 |
| 5,106,540 A * | | 4/1992 | Barma et al. ................. 252/511 |
| 5,571,973 A * | | 11/1996 | Taylot ................... 73/862.046 |
| 6,363,796 B1 * | | 4/2002 | Jiang et al. ............. 73/862.046 |
| 6,664,006 B1 * | | 12/2003 | Munshi ...................... 429/305 |
| 7,068,142 B2 * | | 6/2006 | Watanabe et al. ............. 338/47 |
| 7,467,558 B2 * | | 12/2008 | Fukuda et al. ........... 73/862.68 |
| 2006/0137462 A1 * | | 6/2006 | Divigalpitiya et al. ........ 73/760 |
| 2008/0100046 A1 * | | 5/2008 | Hayakawa et al. .......... 280/735 |
| 2009/0015270 A1 * | | 1/2009 | Hayakawa et al. .......... 324/686 |
| 2009/0120696 A1 * | | 5/2009 | Hayakawa et al. ....... 178/18.05 |

FOREIGN PATENT DOCUMENTS

| | | |
|---|---|---|
| GB | 2 042 188 | 9/1980 |
| JP | A 9-5014 | 1/1997 |
| JP | 09-159402 A | 6/1997 |
| WO | WO 89/04953 A | 6/1989 |

\* cited by examiner

*Primary Examiner*—Max Noori
(74) *Attorney, Agent, or Firm*—Oliff & Berridge, PLC

(57) ABSTRACT

A deformation sensor, which has excellent workability and a high degree of freedom in shape design and which can detect deformation and load in a wide area of components and portions, has a main body of sensor, electrodes which are connected to the main body of sensor and can output electric resistances, and a restraining component which restrains elastic deformation of at least a part of the main body of sensor. The main body of sensor has an elastomer, and spherical conductive fillers which are blended into the elastomer at a high filling rate in an approximately single-particle state, and is elastically deformable. In the main body of sensor, as an elastic deformation increases, the electric resistance increases.

10 Claims, 25 Drawing Sheets

Fig.8
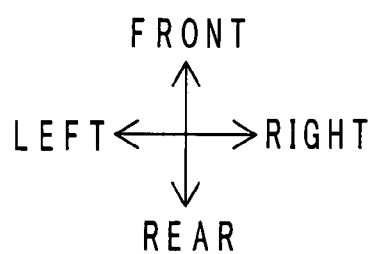
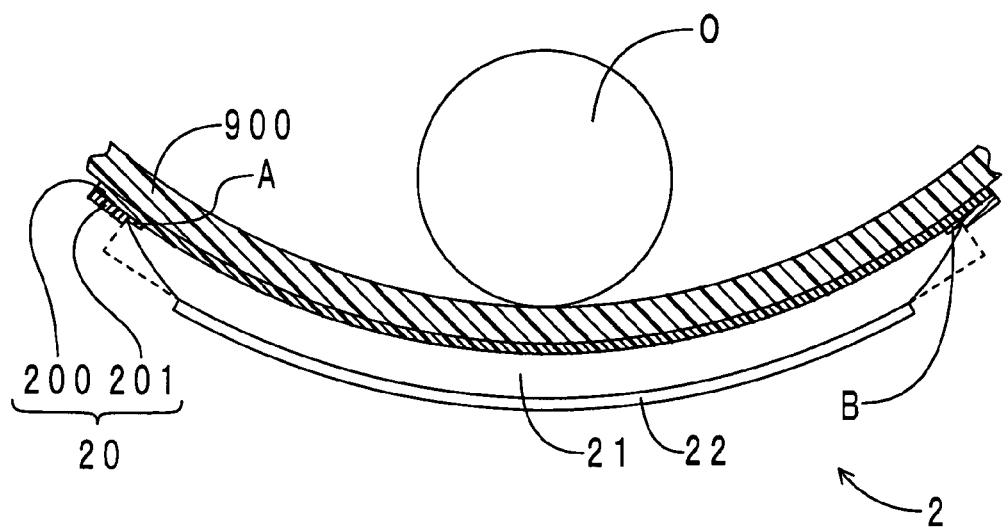

Fig. 10
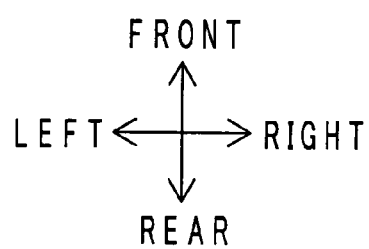
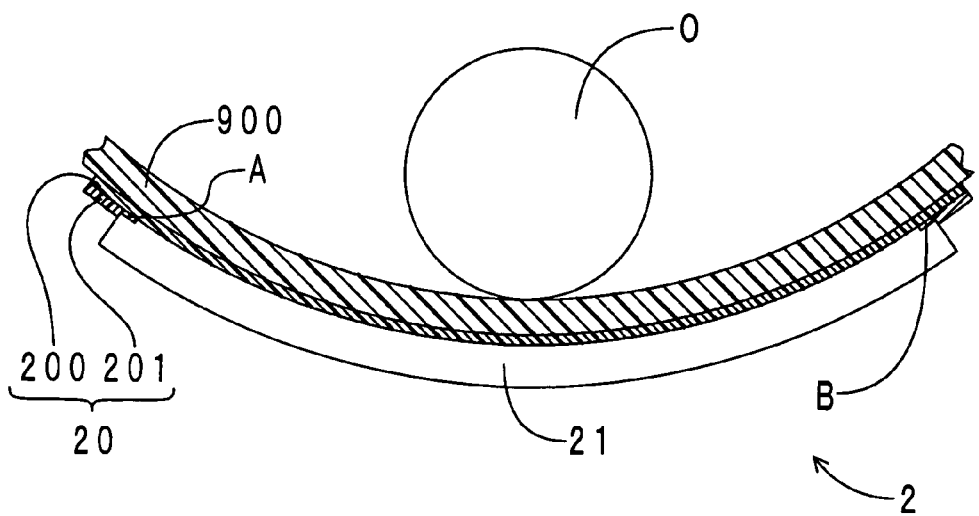

DEFORMATION SENSOR

INCORPORATION BY REFERENCE

This application is based on and claims priority under 35 U.S.C. §119 to Japanese Patent Application No. 2006-251386, filed on Sep. 15, 2006, the entire contents of which is hereby incorporated by reference.

BACKGROUND OF THE INVENTION

1. Field of the Invention

The present invention relates to a deformation sensor which is used for detection of automobile crash and so on.

2. Description of the Related Art

Conventionally, as units which measure deformation of components, and a level and distribution of a load acting on target components, piezoelectric sensors using piezoelectric ceramics such as PZT (lead zirconate titanate), and strain gauge type sensors are used. These sensors are expensive, and have the low degree of freedom in shape design. Sensors using piezoelectric polymer such as PVdF (polyvinylidenefluoride) are proposed. When the piezoelectric polymer is used, a sensor operable temperature range is limited. On the other hand, sensors using pressure sensitive conductive resin are proposed. For example, Japanese Unexamined Patent Publication (KOKAI) No. 9-5014 discloses a bend sensor which measures bending deformation of components based on a change of resistance generated in a pressure sensitive conductive resin film.

Conventional sensors such as piezoelectric sensors detect only local deformation of components. For this reason, it is difficult for the conventional sensors to accurately detect deformation over a wide range of components. The pressure sensitive conductive resin film composing the bend sensor described in Japanese Unexamined Patent Publication (KOKAI) No. 9-5014 is composed of a pressure sensitive conductive ink obtained by blending conductive fillers into polymer. When such a pressure sensitive conductive resin film is pressurized, electric resistance is reduced. That is to say, in non-compressed state, the electric resistance of the pressure sensitive conductive resin film is large, and when compressed, the film is made to be conductive by contact with the conductive fillers in the film, thereby reducing the electric resistance. In the sensor using the pressure sensitive conductive resin film, therefore, when the conductive fillers are brought into a contact state to a certain extent by the compression, a change of the electric resistance becomes small. For this reason, a measuring range is narrow. The sensitivity greatly varies according to the blending percentage of the conductive fillers in the pressure sensitive conductive resin film or the like.

SUMMARY OF THE INVENTION

The present invention has been developed in view of such circumstances, and it is an object of the present invention to provide a deformation sensor which can detect deformation and a load of components and portions in a wide area with excellent workability and high degree of freedom in shape design.

(1) A deformation sensor of the present invention includes: an elastically deformable main body of sensor which has an elastomer and spherical conductive fillers blended into the elastomer at a high filling rate in an approximately single-particle state, and whose electric resistance increases as an elastic deformation increases; an electrode which is connected to the main body of sensor and can output the electric resistance; and a restraining component which restrains the elastic deformation of at least a portion of the main body of sensor.

In order to solve the above problem, the inventors of the invention had repeated zealously research on materials usable in the deformation sensor so as to develop a very special discriminating material whose electric resistance increases according to an increase in an elastic deformation. This material is an elastomer composite material in which spherical conductive fillers are blended into elastomer at a high filling rate in the approximately single-particle state. In the deformation sensor of the present invention, the main body of sensor is composed of the elastomer composite material. The main body of sensor in the deformation sensor of the present invention is described below.

The main body of sensor in the deformation sensor of the present invention (hereinafter, referred to as "the main body of sensor of the present invention" appropriately) is elastically deformable, and has the elastomer and the spherical conductive fillers. In this specification, "elastomer" includes rubber and thermoplastic elastomer. The conductive fillers are blended into the elastomer at the high filling rate in the approximately single-particle state. Here, the "approximately single-particle state" means that not less than 50 weight % of the conductive fillers exists in a single primary particle state, not an agglomerated secondary particle state when a total weight of the conductive fillers is 100 weight %. Furthermore, the "high filling rate" means that the conductive fillers are blended in the state which is proximate to a closest packing.

When the conductive fillers are blended at the high filling rate in the single-particle state, the conductive fillers come in contact with each other via the elastomer so that three-dimensional conductive paths are formed. Therefore, the main body of sensor of the present invention has high conductivity in a load non-applied state (hereinafter, referred to as "no-load state" appropriately), in other words, in an undeformed natural state. In addition, the "elastic deformation" in this specification includes all deformation such as a compression, an extension, a bending and so on.

On the other hand, conventional pressure sensitive conductive resin has high electric resistance in an uncompressed state, and when it is deformed by compression, the electric resistance is reduced. This can be described as follows in view of the constitution of the pressure sensitive conductive resin. That is to say, the pressure sensitive conductive resin is composed of resin, and conductive fillers which are blended into the resin. The filling rate of the conductive fillers is low. For this reason, in the no-load state, the conductive fillers are separated from each other. That is to say, in the no-load state, the electric resistance of the pressure sensitive conductive resin is high. When a load is applied and thus the pressure sensitive conductive resin is deformed, the conductive fillers come in contact with one another, so that one-dimensional conductive paths are formed. As a result, the electric resistance is reduced.

On the contrary, in the main body of sensor of the present invention, the electric resistance increases according to the increase in the elastic deformation. The reason for this is considered as follows. FIGS. 1 and 2 show the change of a conductive path before and after applying a load in the main body of sensor of the present invention as a model. However, FIGS. 1 and 2 merely show examples of the main body of sensor, so this is not intended to limit a shape, a material and so on of the conductive filler and the main body of sensor of the present invention.

As shown in FIG. 1, in a main body of sensor 100, most of the conductive fillers 102 are present in an elastomer 101 in a single-particle state. The filling rate of the conductive fillers 102 is high, and they are blended in the state which is proximate to a closest packing. As a result, in the no-load state, the three-dimensional conductive paths P are formed in the main body of sensor 100 by the conductive fillers 102. In the no-load state, therefore, the electric resistance of the main body of sensor 100 is small. On the other hand, as shown in FIG. 2, when a load is applied to the main body of sensor 100, the main body of sensor 100 is elastically deformed (a dotted-line frame in FIG. 2 shows the no-load state in FIG. 1). Since the conductive fillers 102 are blended in the state which is proximate to a closest packing, a space where the conductive fillers 102 can move is hardly present. Therefore, when the main body of sensor 100 is elastically deformed, the conductive fillers 102 are rebounded against each other, and the contact state of the conductive fillers 102 changes. As a result, the three-dimensional conductive paths P break down, and the electric resistance increases.

The deformation sensor of the present invention having such a main body of sensor can detect a load acting on the target components and portions, and various deformations of the components and portions based on increase and decrease in the electric resistance of the main body of sensor output from an electrode. Since the base material of the main body of sensor is elastomer, it can be elastically deformed. For this reason, the deformation sensor of the present invention can detect various kinds of deformation of components and portions such as a compression, an extension, a bending and so on. The deformation sensor of the present invention has excellent workability and the high degree of freedom in shape design. Therefore, the deformation sensor can detect load and deformations on a wide range of components and portions.

In the deformation sensor of the present invention, the types of the elastomer and the conductive fillers, and the filling rate of the conductive fillers are adjusted, so that the electric resistance value in the no-load state can be set within a predetermined range. For this reason, a detectable load, and an elastically deformation range, namely, a detecting range can be enlarged. Since an increase behavior of the electric resistance with respect to the elastic deformation can be adjusted, desired response sensitivity can be realized.

The deformation sensor of the present invention has high conductivity in the no-load state. That is to say, the deformation sensor of the present invention is brought into a conductive state in the no-load state. For this reason, in the no-load state, the diagnosis of an operation is easier than a sensor with low conductivity (for example, a sensor using conventional pressure sensitive conductive resin). That is to say, in the case where the sensor has low conductivity in a no-load state, it is difficult to determine in the no-load state whether the state is normal or abnormal (for example, disconnection occurs in a circuit). For this reason, it is necessary to daringly apply a comparatively high voltage to the sensor with low conductivity and electrify the sensor. In another way, it is necessary to operate the sensor on trial so as to check the electrically connected state. The diagnosis of the operation is, therefore, complicated. On the contrary, the deformation sensor of the present invention has high conductivity in the no-load state. For this reason, it is easy to determine the normal or abnormal state in the no-load state. The diagnosis of the operation is, therefore, easy.

(2) Preferably, in the constitution of the above (1), the main body of sensor is composed of an elastomer composition which essentially contains the elastomer and the conductive fillers, and in a percolation curve which expresses a relationship between a blending amount of the conductive fillers and the electric resistance of the elastomer composition, the blending amount of the conductive fillers at a second polarity change point at which a change of the electric resistance is saturated (saturation volume fraction: $\phi s$) is not less than 35 vol %.

Generally, when conductive fillers are blended into a insulative elastomer to form an elastomer composition, an electric resistance of the elastomer composition changes depending on a blended amount of the conductive fillers. FIG. 3 schematically shows a relationship between the blending amount of the conductive fillers and the electric resistance in the elastomer composition.

As shown in FIG. 3, when the conductive fillers 102 are blended into the elastomer 101, the electric resistance of the elastomer composition stays about the same as the electric resistance of the elastomer 101 at first. However, when the blending amount of the conductive fillers 102 reaches a certain volume fraction, the electric resistance abruptly decreases, thereby causing insulator-conductor transition (first polarity change point). The blending amount of the conductive fillers 102 at the first polarity change point is called a critical volume fraction ($\phi c$). When the conductive fillers 102 are further blended, the change of the electric resistance becomes small at a certain volume fraction, so that the change of the electric resistance is saturated (second polarity change point). The blending amount of the conductive fillers 102 at the second polarity change point is called a saturated volume fraction ($\phi s$). Such a change of the electric resistance is called a percolation curve, and it is considered that the change is caused because a conductive path P1 is formed by the conductive fillers 102 in the elastomer 101.

For example, the conductive fillers cohere so that an agglomerate is formed for such reasons that a particle diameter of the conductive fillers is small and compatibility between the conductive fillers and the elastomer is not good. In this case, a one-dimensional conductive path is easily formed. At this time, the critical volume fraction ($\phi c$) of the elastomer composition is approximately 20 vol % which is comparatively small. Similarly, the saturated volume fraction ($\phi s$) becomes comparatively small. In other words, when the critical volume fraction ($\phi c$) and the saturated volume fraction ($\phi s$) are small, it is difficult that the conductive fillers exist as primary particles, and secondary particles (agglomerate) are easily formed. In this case, therefore, it is difficult to blend a lot of the conductive-fillers into the elastomer. That is to say, it is difficult to blend the conductive fillers in the state which is proximate to a closest packing. When a lot of the conductive fillers whose particle diameter is small are blended into the elastomer, a agglomeration structure grows three-dimensionally, so that the change of the conductivity according to deformations becomes poor.

According to this constitution, the main body of sensor is composed of the elastomer composition whose saturated volume fraction ($\phi s$) is not less than 35 vol %. Since the saturated volume fraction ($\phi s$) is not less than 35 vol % which is large, the conductive fillers exist stably in the elastomer in an approximately single-particle state. The conductive fillers can be, therefore, blended in the state which is proximate to a closest packing.

(3) Preferably, in the constitution of the above (1), the filling rate of the conductive fillers is not less than 30 vol % to not more than 65 vol % in the case where a total volume of the main body of sensor is 100 vol %.

According to this constitution, the conductive fillers are blended into the elastomer in the state which is proximate to a closest packing. Therefore, the three-dimensional conductive path is easily formed on the main body of sensor by the conductive fillers.

(4) Preferably, in the constitution of the above (1), the conductive fillers are carbon beads. The carbon beads have good conductivity, and is comparatively inexpensive. Since the carbon beads have an approximately spherical shape, they can be blended at a high filling rate.

(5) Preferably, in the constitution of the above (1), an average particle diameter of the conductive fillers is not less than 0.05 µm to not more than 100 µm. According to this constitution, it is difficult that the conductive fillers cohere, and the conductive fillers easily exist in the primary particle state. In addition, the average particle diameter means an average particle diameter of the conductive fillers that exist in the primary particle state.

(6) Preferably, in the constitution of the above (1), the elastomer includes one rubber selected from the group consisting of silicone rubber, ethylene-propylene copolymer rubber, natural rubber, styrene-butadiene copolymer rubber, acrylonitrile-butadiene copolymer rubber and acrylic rubber. According to this constitution, compatibility between the elastomer and the conductive fillers is satisfactory. For this reason, the conductive fillers easily exist in the single-particle state.

(7) Preferably, in the constitution of the above (1), the main body of sensor is elastically bending deformable. According to this constitution, the change of the electric resistance due to the bending deformation can be detected. Furthermore, as compared with a simple compression deformation and a simple extension deformation, a bending deformation can easily obtain large elastic deformation. For this reason, according to this constitution, detecting accuracy becomes high.

(8) Preferably, in the constitution of the above (7), the main body of sensor has an input surface into which a load is input from the outside, and an anti-input surface opposite to the input surface at their back sides, and the restraining component which restrains the elastic deformation on at least one of the input surface and the anti-input surface is arranged on the one surface. According to this constitution, the elastic deformation on at least one of the input surface and the anti-input surface is restrained by the restraining component. As a result, a difference between an elastic deformation on the input surface and an elastic deformation on the anti-input surface becomes large. As a result, the elastic deformation of the entire main body of sensor becomes large, and thus an increase amount of the electric resistance becomes large. That is to say, the load to be input into the input surface and the deformation due to the load are easily detected.

(9) Preferably, in the constitution of the above (1), the main body of sensor has a long shape, and the plurality of electrodes are arranged long a longitudinal direction of the main body of sensor. For example, when a load is applied to the end in the longitudinal direction of the main body of sensor and the main body of sensor is bent, in this constitution, the elastic deformation of the main body of sensor can be effectively output as the increase amount of the electric resistance. When the electrodes are arranged in the longitudinal direction of the main body of sensor at predetermined intervals, more definite sensing is enabled.

(10) Preferably, in the constitution of the above (1), the main body of sensor has a flat-plate shape, and at least two or more pairs of electrode, where the two electrodes are opposite to each other, are arranged on a peripheral edge of the main body of sensor. Since the main body of sensor has the flat-plate shape, a load and a deformation on a wider area can be detected. When the arrangement of the electrodes are enabled to be adjusted and the detecting position is enabled to be specified, the application position of the load and the deformation position can be specified.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 8 is a cross-section view when viewed from above the deformation sensor (after crash).

FIG. 10 is a cross-section view when viewed from the deformation sensor (after crash).

DETAILED DESCRIPTION OF THE PREFERRED EMBODIMENT

Figure 1:
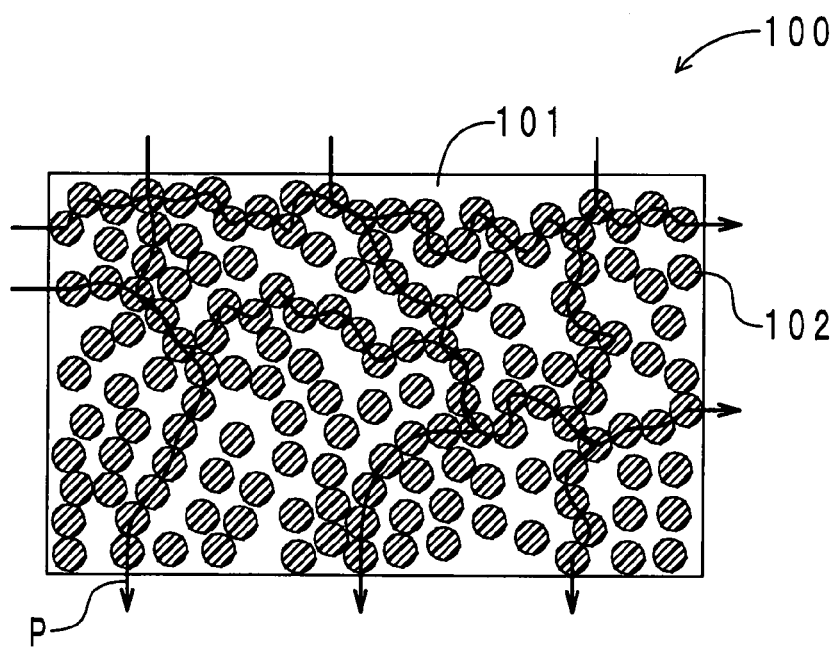
FIG. 1 is a pattern diagram for showing a conductive path of a main body of sensor before applying a load in the present invention.

Having generally described the present invention, a further understanding can be obtained by reference to the specific preferred embodiments which are provided herein for the purpose of illustration only and not intended to limit the scope of the appended claims.

The preferred embodiments of the deformation sensor of the present invention will be explained as follows. First, the main body of sensor which constitutes the deformation sensor of the present invention will be explained in detail, and then, the preferred embodiments of the deformation sensor of the present invention will be explained in detail.

<Main Body of Sensor>

The main body of sensor composing the deformation sensor of the present invention has an elastomer and conductive fillers. The elastomer is approximately selected from the group consisting of rubber and a thermoplastic elastomer. It is preferable that the elastomer is insulative. Furthermore, when a mixture of the elastomer and the conductive fillers (elastomer composition) is prepared, it is preferable that a saturated volume fraction ($\phi s$) in a percolation curve is not less than 35 vol %. When the saturated volume fraction ($\phi s$) is less than 35 vol %, it is difficult to blend the conductive fillers at a high filling rate in an approximately single-particle state. In an area of not less than the saturated volume fraction ($\phi s$), electric resistance is low, thereby providing stable conductivity. In the case where, therefore, the saturated volume fraction ($\phi s$) is not less than 35 vol %, a range where the electric resistance changes from a conductor to an insulator at the time of deformation becomes wide. Furthermore, it is more preferable to use an elastomer in which the saturated volume fraction ($\phi s$) is not less than 40 vol %. By the way, in the present specification, an "elastomer composition" requires an elastomer and spherical conductive fillers as an essential ingredient. Namely, it can include a mixture of an elastomer and spherical conductive fillers, or a mixture of an elastomer, spherical conductive fillers and other additives and so on.

Taking the compatibility between the elastomer and the conductive fillers into consideration, the elastomer whose gel fraction expressed by the following formula (I) is not more than 15% may be used. It is more preferable that the gel fraction is not more than 10%.

$$\text{Gel fraction (\%)} = (Wg - Wf)/Wf \times 100 \quad (1)$$

[In the formula (I), Wg is a weight of a solvent insoluble (gel comprising the conductive fillers and the elastomer) that is obtained by dissolving an elastomer composition, in which the conductive fillers are mixed with an elastomer, into a good solvent of the elastomer. Wf is a weight of the conductive fillers. By the way, the good solvent of the elastomer is preferably the one in which a SP value (solubility parameter) between the solvent and the elastomer is close, for example, toluene, tetrahydrofuran, chloroform and so on.]

The gel fraction becomes an indicator of a critical volume fraction ($\phi c$) in the percolation curve. That is to say, when the critical volume fraction ($\phi c$) is less than 30 vol %, a lot of elastomer matters which are adsorbed to and combined with the agglomerate of the conductive fillers exist. For this reason, the gel fraction becomes a comparatively large value. On the contrary, when the critical volume fraction ($\phi s$) is not less than 30 vol %, the conductive fillers exist in the approximately single-particle state. For this reason, the less number of elastomer matters are adsorbed to and combined with the agglomerate of the conductive fillers, and the gel fraction becomes a comparatively small value of not more than 15%.

Concrete examples of the elastomer are natural rubber (NR), isoprene rubber (IR), butadiene rubber (BR), acrylonitrile-butadiene copolymer rubber (NBR), styrene-butadiene copolymer rubber (SBR), ethylene-propylene copolymer rubber [ethylene-propylene copolymer (EPM), ethylene-propylene-diene ternary copolymer (EPDM) or the like], butyl rubber (IIR), halogenated butyl rubber (Cl-IIR, Br-IIR or the like), hydrogenated nitrile rubber (H-NBR), chloroprene rubber (CR), acrylic rubber (AR), chlorosulfonated polyethylene rubber (CSM), hydrin rubber, silicone rubber, fluorine-contained rubber, urethane rubber, synthetic latex and so on. Examples of the thermoplastic elastomer include various thermoplastic elastomers such as styrene elastomer, olefin elastomer, urethane elastomer, polyester elastomer, polyamide elastomer and fluorine elastomer, and their derivatives. One kind of them may be used independently, or two or more kinds of them may be used. Above all, EPDM whose compatibility with the conductive fillers is extremely satisfactory is preferable. NBR and silicone rubber whose compatibility with the conductive fillers is satisfactory are preferable.

The conductive fillers have a spherical shape. The spherical shape includes not only a true spherical shape, an approximately true spherical shape, but also a elliptic spherical shape, an oval spherical shape (the shape in which a pair of opposite hemispheres are connected by a column), a partial spherical shape, a spherical shape in which a radius is different with respect to each part, a droplet shape and so on. For example, an aspect ratio of the conductive fillers (a ratio of a long side to a short side) is preferably within a range of not less than 1 to not more than 2. When the aspect ratio becomes larger than 2, a one-dimensional conductive path is easily formed by contact between the conductive fillers. In this case, the above-mentioned saturated volume fraction ($\phi s$) can be less than 35 vol %. From a viewpoint that a filling state of the conductive fillers in the elastomer is made to the state which is proximate to a closest packing, particles having a true spherical shape or a shape which is extremely close to a true sphere (an approximately true spherical shape) can be adopted as the conductive fillers.

The conductive fillers are not especially limited only if they are particles having conductivity. Examples of the particles are fine particles of a carbon material and a metal. Among these, one kind of particles can be used independently, or two kinds of particles can be used together.

It is preferable that the conductive fillers do not cohere as much as possible and exist in a single-particle state. Therefore, when the conductive fillers are selected, an average particle diameter and the compatibility with the elastomer or the like may be considered. For example, it is preferable that the average particle diameter (primary particle) of the conductive fillers is not less than 0.05 μm to not more than 100 μm. When the average particle diameter is less than 0.05 μm, the conductive fillers cohere so as to easily form secondary particles. The saturated volume fraction ($\phi s$) might be less than 35 vol %. The average particle diameter is preferably not less than 0.5 μm, more preferably not less than 1 μm. On the contrary, when the average particle diameter exceeds 100 μm, a translation movement (parallel movement) of the conductive fillers due to the elastic deformation becomes comparatively smaller than the particle diameter, and a change of the electric resistance with respect to the elastic deformation of the main body of sensor becomes slow. The average particle diameter is preferably not more than 60 μm, more preferably not more than 30 μm. The combination of the conductive fillers and the elastomer, and the average particle diameter or the like of the conductive fillers are suitably adjusted, so that the critical volume fraction (c) and the saturated volume fraction (φs) can be adjusted within a desired range.

The value of D90/D10 in a particle size distribution of the conductive fillers is preferably not less than 1 to not more than 30. Here, D90 means a particle diameter with which an accumulated weight becomes 90%, and D10 means a particle diameter with which the accumulated weight becomes 10% in a cumulative particle size curve. When the value of D90/D10 exceeds 30, the particle size distribution becomes broad, so that an increase behavior of the electric resistance according to the elastic deformation of the main body of sensor becomes unstable. Due to this, there is a fear that a detection repeatability decreases. It is more preferable that the value of D90/D10 is not more than 10. When two or more kinds of particles are used as the conductive fillers, the value of D90/D10 may be not more than 100.

As such conductive fillers, for example, carbon beads are preferable. Concretely, meso carbon micro beads manufactured by Osaka Gas Chemicals Co., Ltd. [MCMB6-28 (an average particle diameter is approximately 6 μm), MCMB10-28 (an average particle diameter is approximately 10 μm), MCMB25-28 (an average particle diameter is approximately 25 μm)], carbon micro beads manufactured by Nippon Carbon Co., Ltd.: NICABEADS® ICB, NICABEADS PC, NICABEADS MC, NICABEADS MSB [ICB0320 (an average particle diameter is approximately 3 μm), ICB0520 (an average particle diameter is approximately 5 μm), ICB1020 (an average particle diameter is approximately 10 μm), PC0720 (an average particle diameter is approximately 7 μm), MC0520 (an average particle diameter is approximately 5 μm)], carbon beads (an average particle diameter is approximately 10 μm) manufactured by NISSHINBO INDUSTRIES, INC. and so on are used.

The conductive fillers are blended into the elastomer at a high filling rate. In order to provide desired conductivity, it is preferable that the conductive fillers are blended at a rate higher than the critical volume fraction (φc) in the approximately percolation curve. From the viewpoint that the conductive fillers are blended at the high filling rate in the single-particle state, it is preferable that the critical volume fraction (φc) is not less than 30 vol %. Not less than 35 vol % is more preferable. It is, therefore, preferable that the filing rate of the conductive fillers is not less than 30 vol % to not more than 65 vol % in the case where the entire volume of the main body of sensor is 100 vol %. When the filling rate is less than 30 vol %, the conductive fillers cannot be blended in the state which is proximate to a closest packing, so the desired conductivity cannot be exhibited. Moreover, the change of the electric resistance according to the elastic deformation of the main body of sensor becomes slow, and it is difficult to control the increase behavior of the electric resistance. It is more preferable that the filling rate is not less than 35 vol %. On the contrary, when the filling rate exceeds 65 vol %, the blending into the elastomer becomes difficult, thereby deteriorating formability. Further, it is difficult to elastically deform the main body of sensor. Not more than 55 vol % is more preferable.

In addition to the elastomer and the conductive fillers, various additives may be blended in the main body of sensor. Examples of the additives include a cross-linking agent, a vulcanization accelerator, a vulcanization co-agent, an anti-oxidant, a plasticizing agent, a softener, a coloring agent and so on. Furthermore, together with the above-mentioned spherical conductive fillers, conductive fillers of irregular shape (for example, needle shape and so on) may be blended.

The main body of sensor can be manufactured in the following procedures. First, additives such as a vulcanization co-agent and a softener and so on are added to the elastomer to be kneaded. Next, the conductive fillers are added and kneaded, and then, a cross-linking agent and a vulcanization accelerator are added to be kneaded, so that an elastomer composition is formed. Next, The elastomer composition is formed into a sheet shape, and it is filled in a metal mold, and is subjected to a press vulcanization under the predetermined condition.

Deformation Sensor (1) First Embodiment

Figure 4:
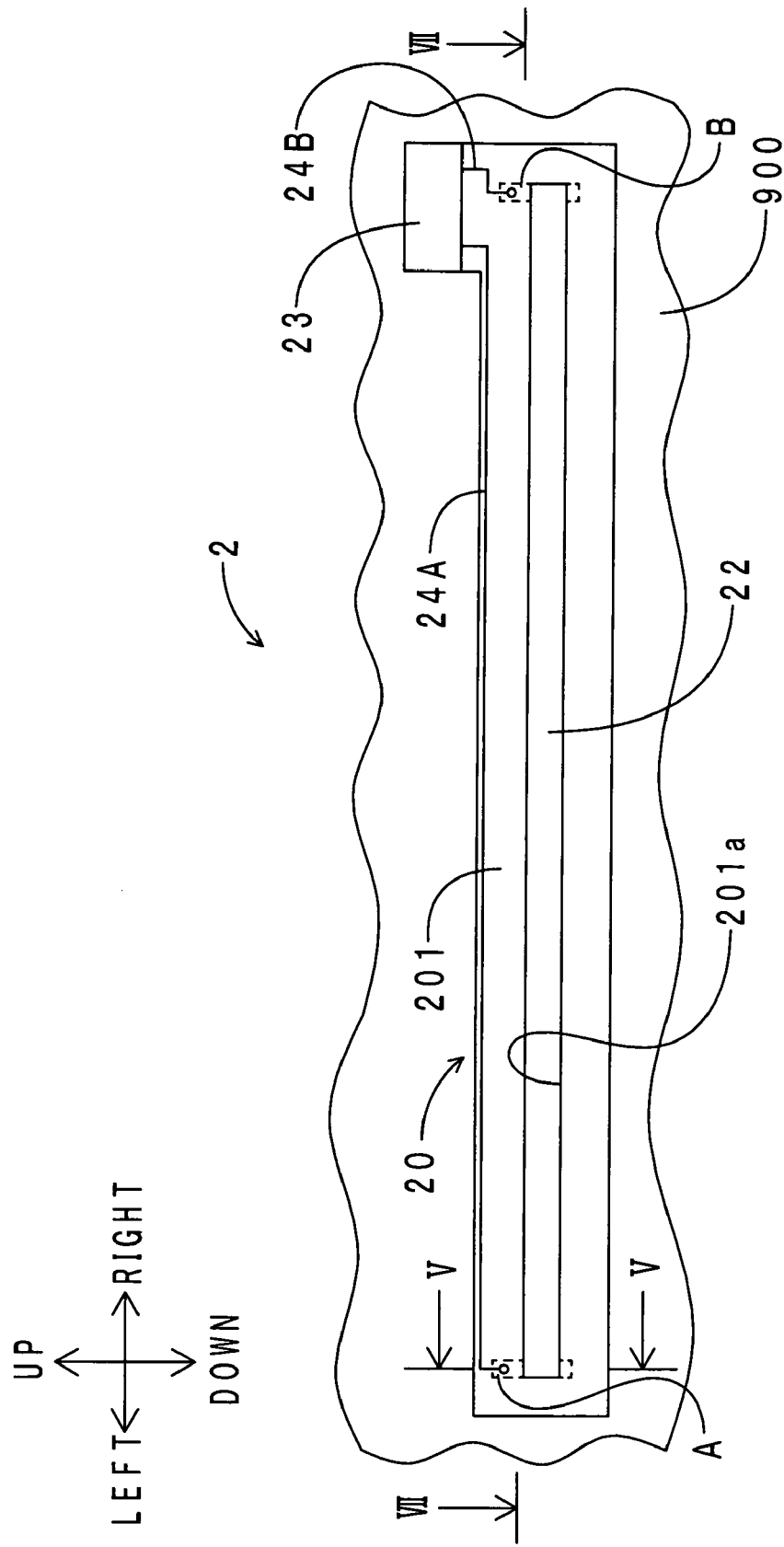
FIG. 4 is a front view of a deformation sensor according to the first embodiment of the present invention.
Figure 5:
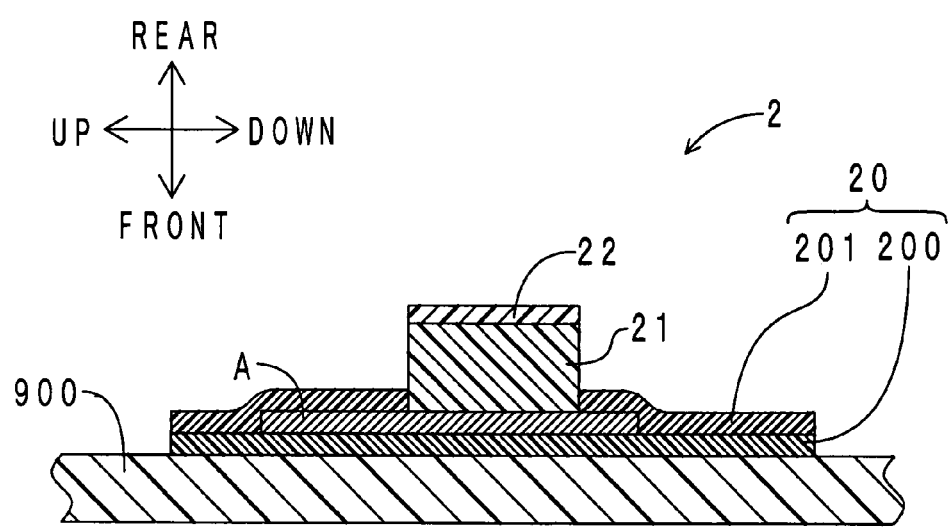
FIG. 5 is a V-V cross sectional view of FIG. 4.

A constitution of the deformation sensor according to this embodiment is described below. FIG. 4 is a front view of the deformation sensor. FIG. 5 is a V-V cross sectional view of FIG. 4. In FIG. 5, for convenience of the description, a conductive wire is omitted. As shown in FIGS. 4 and 5, the deformation sensor 2 has an electrode film section 20, a main body of sensor 21, and a restraining film section 22.

The electrode film section 20 has a base material film 200 and a cover film 201. The base material film 200 is made of polyimide and has a band shape which extends to a right-left direction. The base material film 200 is fixed to a surface of a base material 900. A connector 23 is mounted to a right end of the base material film 200.

The cover film 201 is made of polyimide, and has a band shape which extends to a right-left direction. The cover film 201 covers the surface of the base material film 200. A long hole 201a which extends to a right-left direction and corresponds to the main body of sensor 21 is provided to a center of a widthwise direction (up-down direction) of the cover film 201.

The main body of sensor 21 has a long plate shape which extends to a right-left direction. The main body of sensor 21 is fixed to the surface of the base material film 200 in a state that the main body of sensor 21 is housed in the long hole 201a of the cover film 201. A contact surface of the main body of sensor 21 with the base material film 200 becomes an input surface into which a load is input.

The main body of sensor 21 is composed of an elastomer composite material in which carbon beads ("NICABEADS ICB0520" manufactured by Nippon Carbon Co., Ltd.; an average particle diameter is approximately 5 μm) are blended into EPDM. The filling rate of the carbon beads is 48 vol % in the case where the volume of the main body of sensor 21 is 100 vol %. In a percolation curve of the elastomer composition in which carbon beads are blended into EPDM, the critical volume fraction (φc) is 43 vol %, and the saturated volume fraction (φs) is 48 vol %.

An electrode A is mounted to a left end of the main body of sensor 21, and an electrode B is mounted to a right end. More specifically, the electrodes A and B have a strip shape which extends up and down, and are laid between the main body of sensor 21 and the base material film 200, and between the cover film 201 and the base material film 200, respectively. The electrode A and a connector 23 are connected by a conductive wire 24A, and the electrode B and the connector 23 are connected by a conductive wire 24B, respectively.

The restraining film section 22 is made of polyimide and has a band shape which extends to a right-left direction. The restraining film section 22 is fixed to the surface (rear surface) of the main body of sensor 21 opposite to the base material film 200. The contact surface of the main body of sensor 21 with the restraining film section 22 is an anti-input surface. The base material film 200 and the restraining film section 22 are included in a restraining component of the present invention.

Figure 6:
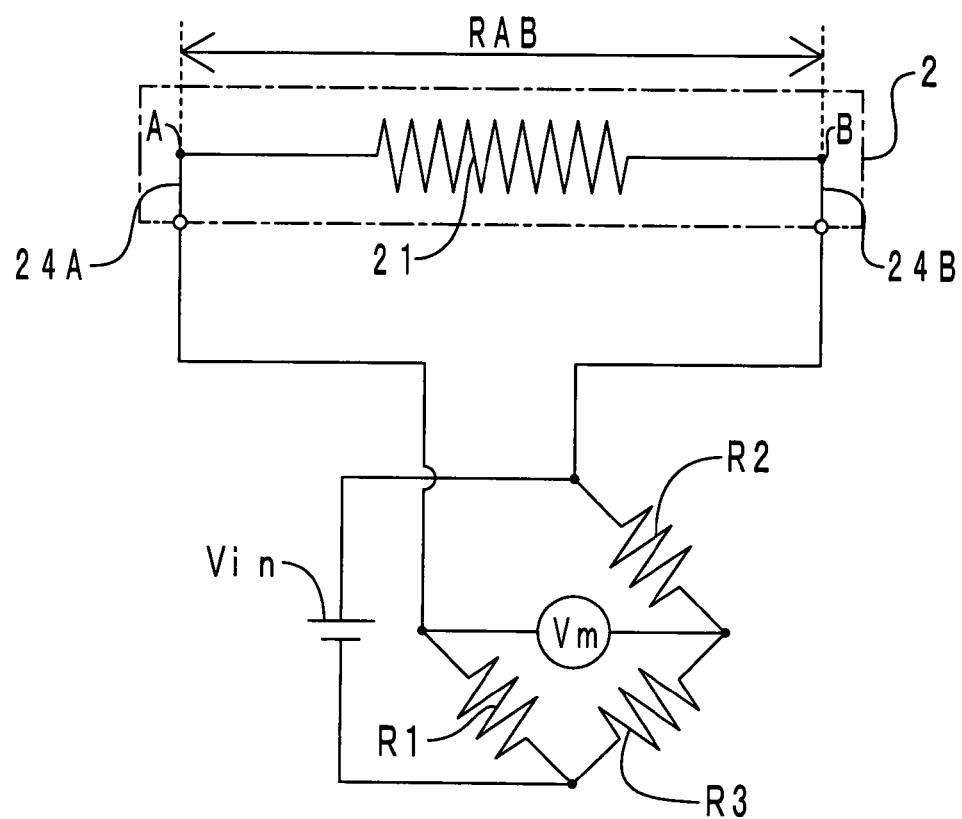
FIG. 6 is a pattern diagram of a circuit into which the deformation sensor is incorporated.

A circuit into which the deformation sensor 2 is incorporated is described below. FIG. 6 shows a pattern diagram of the circuit. As shown in FIG. 6, the main body of sensor 21 is connected to a Wheatstone bridge circuit via the conductive wire 24A connected to the electrode A and the conductive wire 24B connected to the electrode B. A voltage of a power source Vin, and electric resistances of the resistors R1, R2 and R3 are already known. When a voltage value of a voltmeter Vm is measured, so that the electric resistance of the main body of sensor 21 can be measured.

Figure 7:
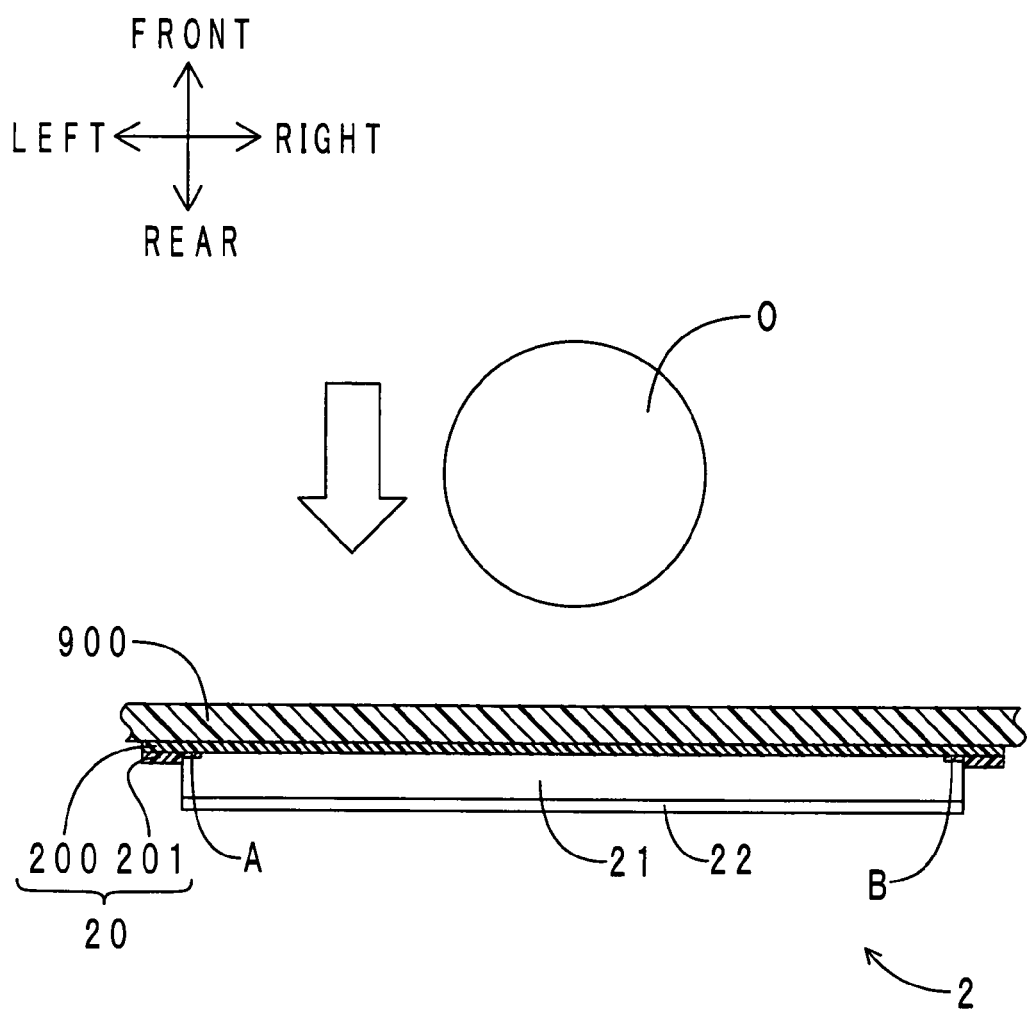
FIG. 7 is a cross-section view when viewed from above the deformation sensor (before crash, corresponding to a cross-section view taken along line VII-VII of FIG. 4).

Next, an operation of the deformation sensor 2 in the case where an object to crash O on the base material 900 side crashes is described below. FIG. 7 is a cross-section view when viewed from above the deformation sensor (before crash, corresponding to a cross-section view taken along line VII-VII of FIG. 4). FIG. 8 is a cross-section view when viewed from above the deformation sensor after crash. In FIGS. 7 and 8, the crash direction of the object to crash O is a front-rear direction.

As shown in FIGS. 7 and 8, the object to crash O crashes against the base material 900 at a front, the base material 900 is deformed so as to subside backward. The deformation of the base material 900 is transmitted to the main body of sensor 21 via the base material film 200. For this reason, the main body of sensor 21 is curved elastically into a C shape where it is opened on a front side.

In a before-crash state, shown in FIG. 7, as shown in FIG. 1, the main body of sensor is filled with the conductive fillers 102 in a state which is proximate to a closest packing. For this reason, a lot of conductive paths P are formed. Therefore, the electric resistance between the electrodes A and B detected by the circuit in FIG. 6 is comparatively low.

Figure 2:
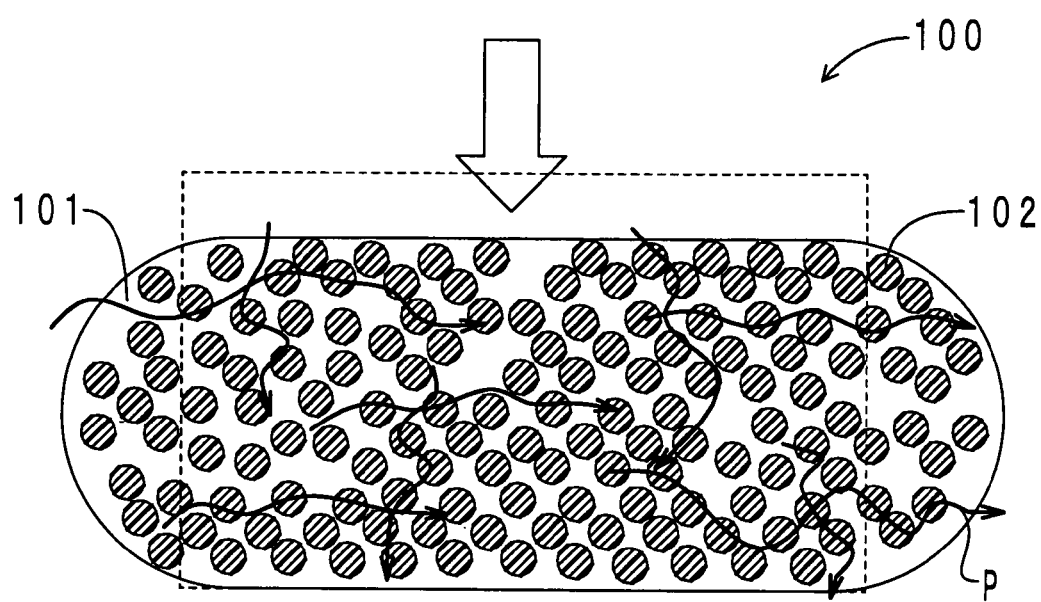
FIG. 2 is a pattern diagram for showing the conductive path of the main body of sensor after applying the load.
Figure 3:
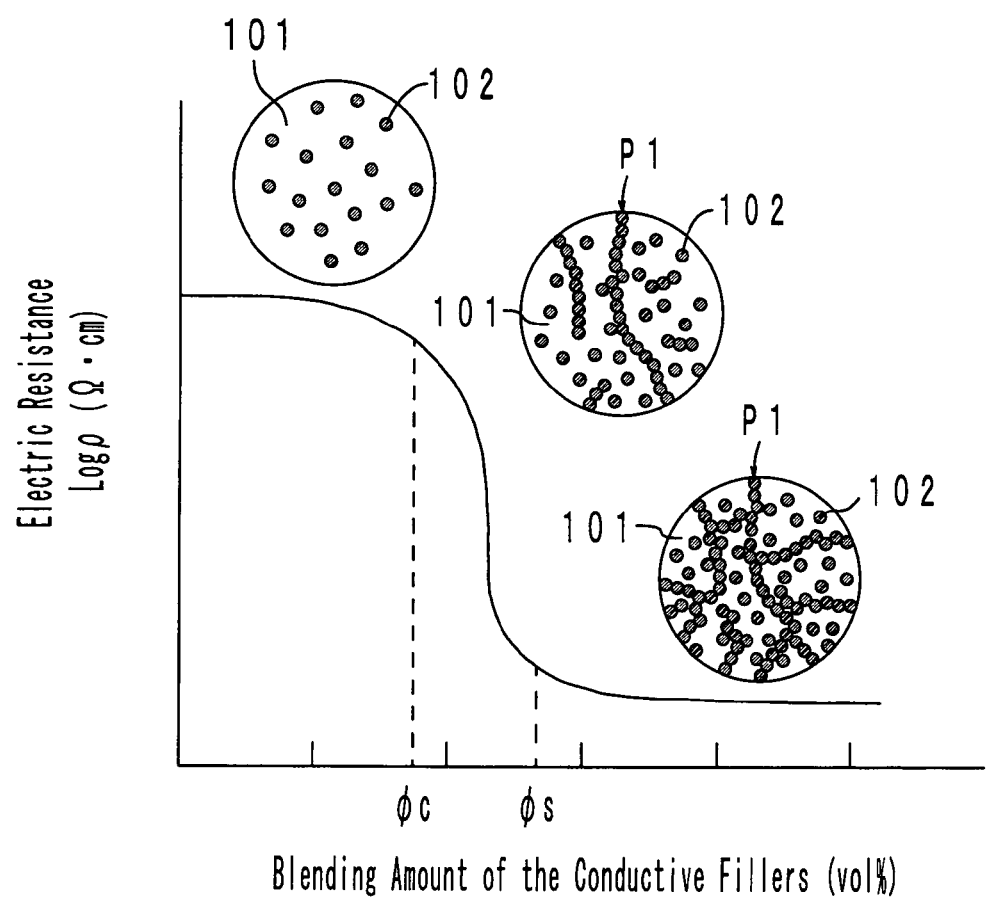
FIG. 3 is a pattern diagram of a percolation curve in an elastomer composition.

On the contrary, in a after-crash state shown in FIG. 8, as shown in the above-mentioned FIG. 2, the conductive fillers 102 are rebound against each other. For this reason, the conductive paths P break down. Therefore, the electric resistance between the electrodes A and B detected by the circuit in FIG. 6 becomes higher than the electric resistance in the before-crash state.

Further, as shown in FIG. 8, the restraining film section 22 is fixed to the surface (rear surface) of the main body of sensor 21. For this reason, an extension deformation near the rear surface of the main body of sensor 21 due to crash is restrained by the restraining film section 22. Concretely, as shown by a dotted line in FIG. 8, the restraining film 22 controls the extension deformation near the rear surface of the main body of sensor 21, and the main body of sensor 21 is subjected to shearing deformation. When both the surfaces of the main body of sensor 21 are restrained, concentration of large strain can be induced, thereby further increasing the electric resistance between the electrodes A and B.

An action and an effect of the deformation sensor 2 according to the first embodiment is described below. In the deformation sensor 2 in the first embodiment, when the main body of sensor 21 is elastically deformed, the electric resistance increases. For this reason, a load acting on the base material 900, deformations such as compression and bend can be easily detected based on the increase in the electric resistance of the main body of sensor 21 output from the electrodes A and B. Since the base material of the main body of sensor 21 is elastomer (EPDM), its workability is excellent. A degree of freedom of the arrangement position is, therefore, high.

The deformation sensor 2 of the first embodiment is in an undeformed free state and in a conductive state. Therefore, an electric current is applied to the circuit into which the deformation sensor 2 is incorporated, thereby easily conducting a self diagnosis as to whether the deformation sensor 2 is operable.

(2) Second Embodiment

A different point of the deformation sensor in the second embodiment from the deformation sensor in the first embodiment is that the restraining film section is not arranged on the rear surface of the main body of sensor. Therefore, here, only the different point is described below.

Figure 9:
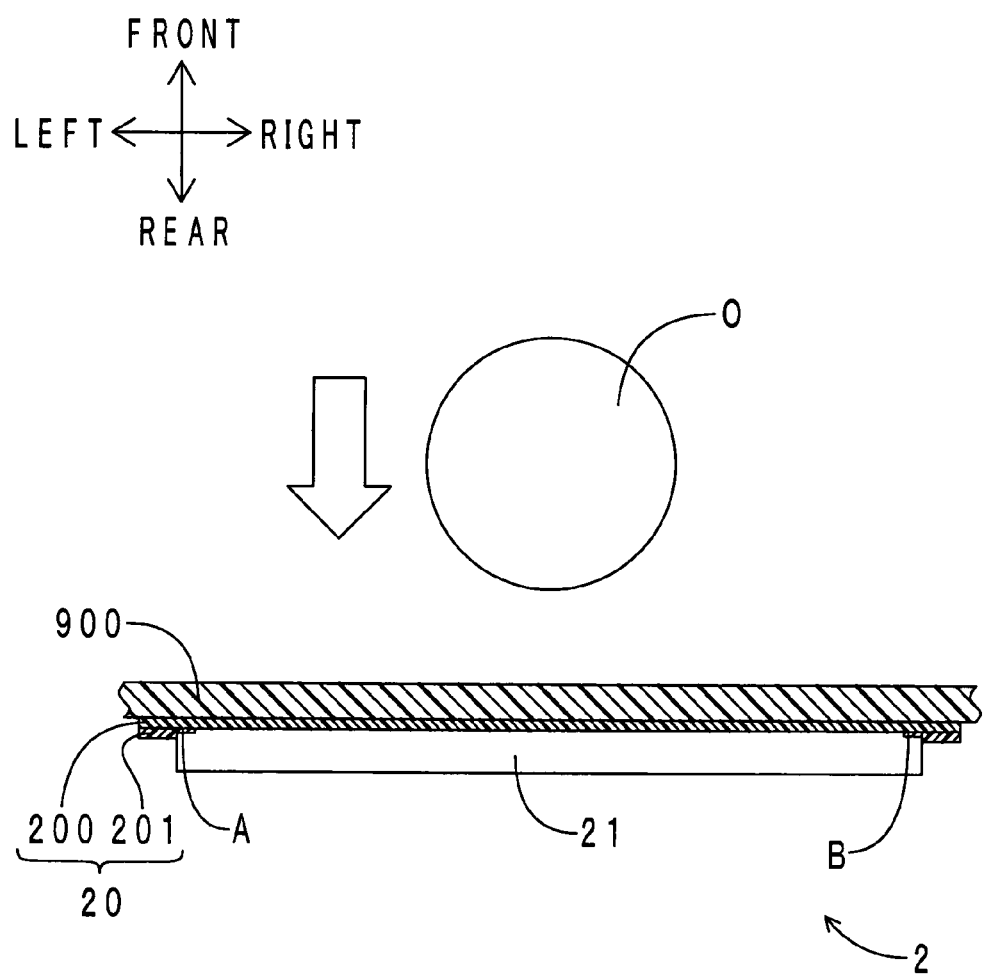
FIG. 9 is a cross-section view when viewed from a deformation sensor according to the second embodiment of the present invention (before crash).

FIG. 9 is a cross-section view when viewed from above the deformation sensor according to the second embodiment before crash. By the way, Portions corresponding to those in FIG. 7 are indicated as the same symbols. FIG. 10 is a cross-section view when viewed from above the deformation sensor in the second embodiment after crash. Portions corresponding to those in FIG. 8 are indicated as the same symbols.

As shown in FIGS. 9 and 10, the restraining film section 22 is not arranged on the surface (rear surface) of the main body of sensor 21 opposite to the base material film 200. When the object to crash O crashes against the base material 900 at a front side, the base material 900 is deformed so as to subside to the rear side. The deformation of the base material 900 is transmitted to the main body of sensor 21 via the base material film 200. For this reason, the main body of sensor 21 is elastically curved into a C shape where it is opened to the front side. The restraining film section is not arranged on the back surface of the main body of sensor 21. For this reason, the extension deformation near the back surface of the main body of sensor 21 is not controlled (the main body of sensor 21 is deformed up to a dotted-line portion in FIG. 8). In such a form that only one surface of the main body of sensor 21 is restrained, the increase in the electric resistance based on the extension deformation is predominant.

The deformation sensor of this preferred embodiment has the same action and effect as those of the deformation sensor of the first preferred embodiment. Furthermore, according to the deformation sensor 2 of the second embodiment, since the restraining film section is not arranged, the constitution becomes simple, thereby repressing the manufacturing cost.

(3) Third Embodiment

A different point of the deformation sensor in the third embodiment from the deformation sensor in the first embodiment is that four electrodes are arranged on the main body of sensor. Therefore, here, only the different point is described below.

Figure 11:
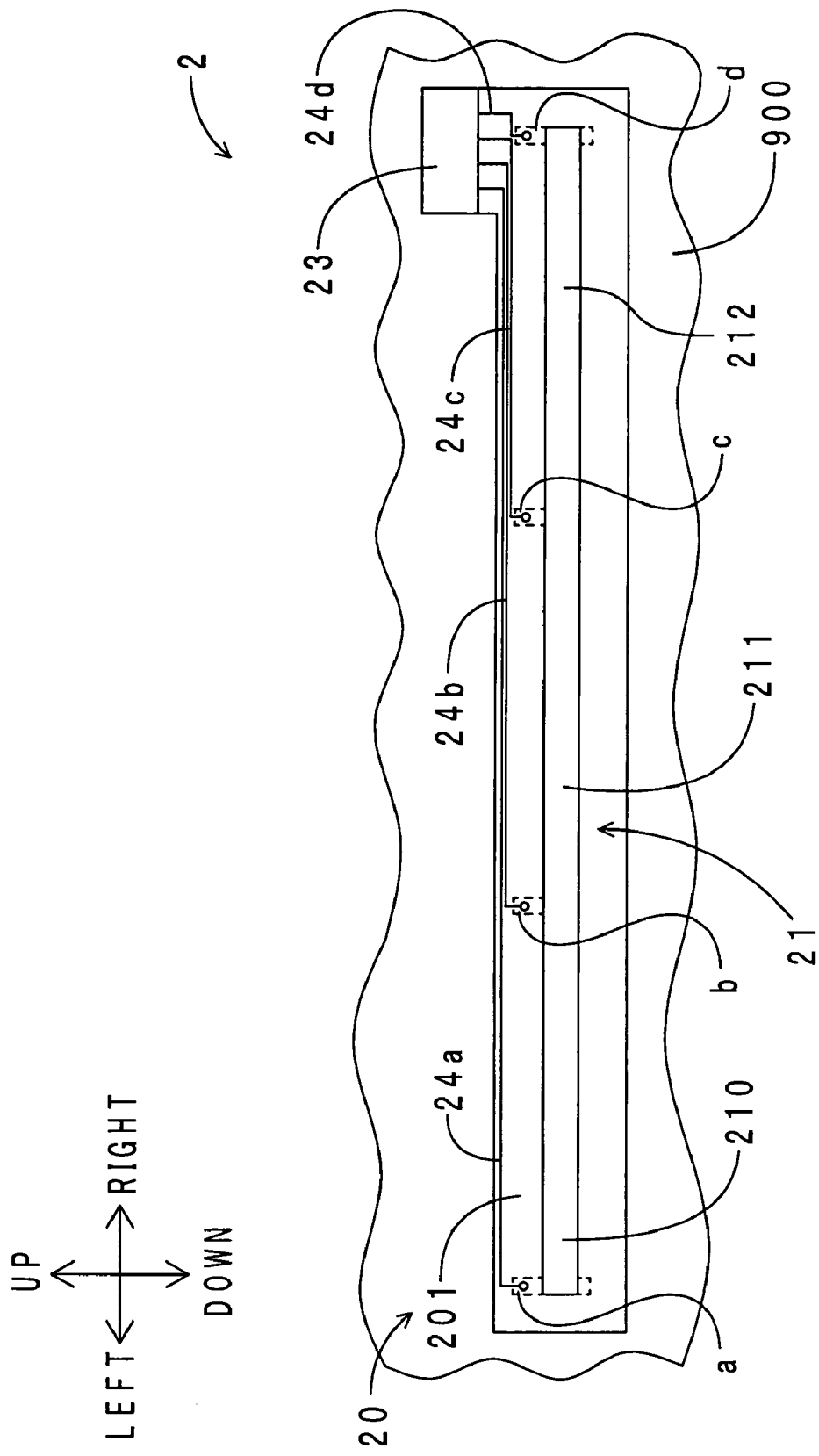
FIG. 11 is a front view of a deformation sensor according to the third embodiment of the present invention.

FIG. 11 shows a front view of the deformation sensor according to the third embodiment. In FIG. 11, for convenience of the description, the restraining film section is omitted. Portions corresponding to those in FIG. 4 are indicated as the same symbols. As shown in FIG. 11, four electrodes a to d are arranged on the main body of sensor 21 so as to be separated by predetermined intervals in the right-left direction. The electrodes a to d and the connector 23 are connected by conductive wires 24a to 24d, respectively. The main body of sensor 21 is divided into three zones 210, 211 and 212 by the electrodes a to d.

Figure 12:
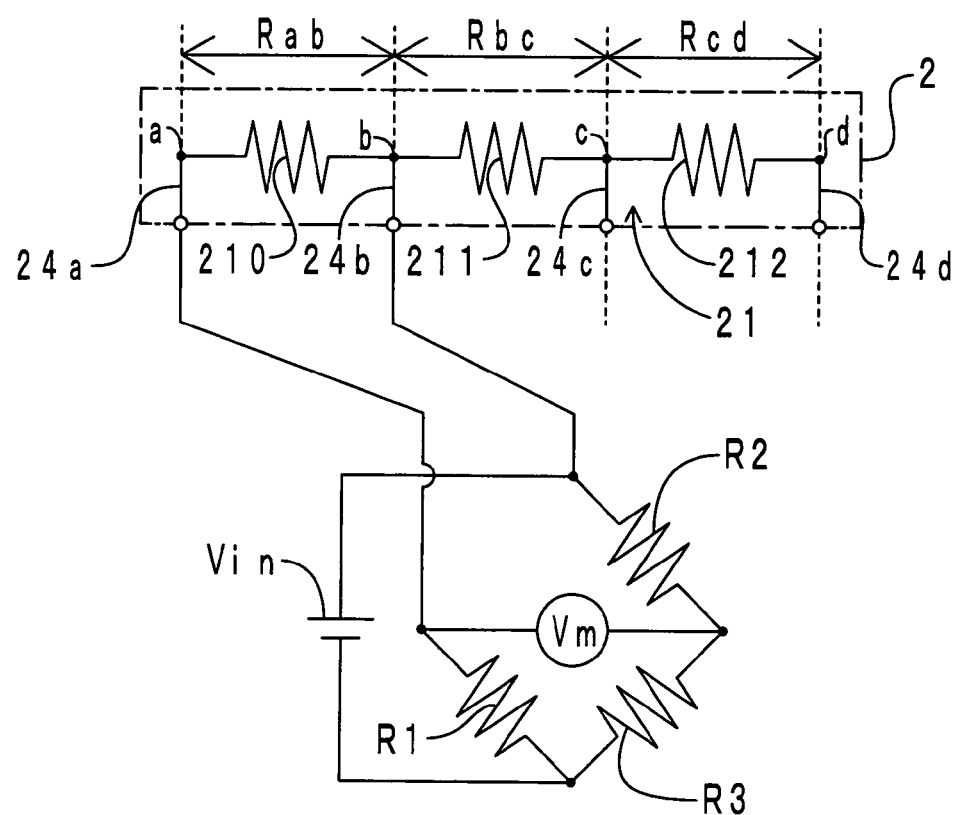
FIG. 12 is a pattern diagram of a circuit into which the deformation sensor is incorporated.

FIG. 12 is a pattern diagram of a circuit into which the deformation sensor of the third embodiment is incorporated. Portions corresponding to those in FIG. 6 are indicated as the same symbols. As shown in FIG. 12, a resistor Rab in the zone 210 between the electrodes a and b, a resistor Rbc in the zone 211 between the electrode b and c, and a resistor Rcd in the zone 212 between the electrodes c and d are switched so as to be sequentially connected to the Wheatstone bridge circuit. For this reason, a change of the electric resistances of the resistors Rab, Rbc and Rcd is repeatedly output.

The deformation sensor 2 of the third embodiment has the same action and effect as those of the deformation sensor of the first preferred embodiment. Furthermore, According to the deformation sensor 2 of the third embodiment, the four electrodes are arranged so as to divide the main body of sensor 21 in the right-left direction. For this reason, even in a deformation in a small area, an increase in the electric resistance is securely output, so that crash or the like can be determined accurately. The increase in the electric resistance in each area is input, so that a deformed position can be easily specified.

(4) Fourth Embodiment

A different point of the deformation sensor in the fourth embodiment from the deformation sensor in the first embodiment is that the main body of sensor has a flat-plate shape. And, the deformation sensor is included in a component, and the restraining film section is not arranged on the surface of the main body of sensor. Therefore, here, only the different point is described below.

Figure 13:
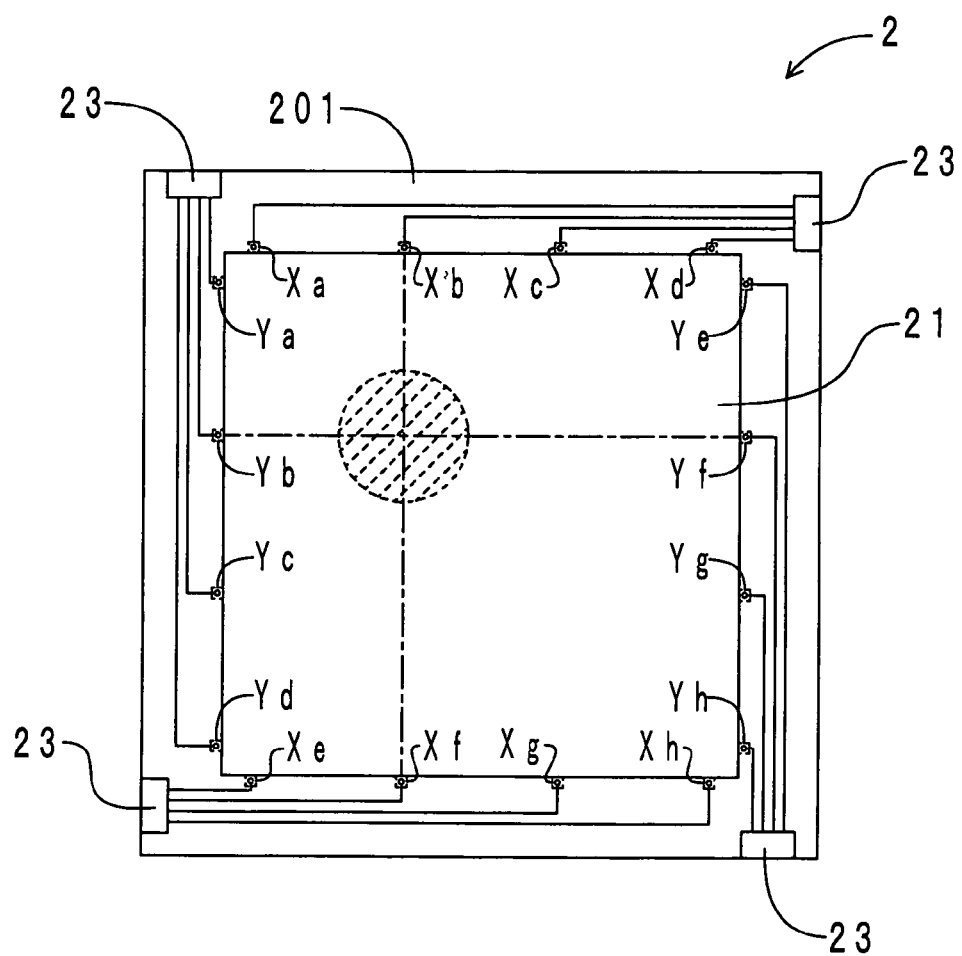
FIG. 13 is a front view of a deformation sensor according to the fourth embodiment of the present invention.

FIG. 13 is a front view of the deformation sensor according to the fourth embodiment. Portions corresponding to those in FIG. 4 are indicated as the same symbols. As shown in FIG. 13, the deformation sensor 2 has a quadrate shape. The deformation sensor 2 is included in the component (not shown). The main body of sensor 21 has a quadrate flat-plate shape. Electrodes Xa to Xh and Ya to Yh are arranged on four sides of the main body of sensor 21. The electrodes Xa and Xe, the electrodes Xb and Xf, the electrodes Xc and Xg, the electrodes Xd and Xh, the electrodes Ya and Ye, the electrodes Yb and Yf, the electrodes Yc and Yg and the electrodes Yd and Yh are arranged so as to be opposite to each other.

Figure 14:
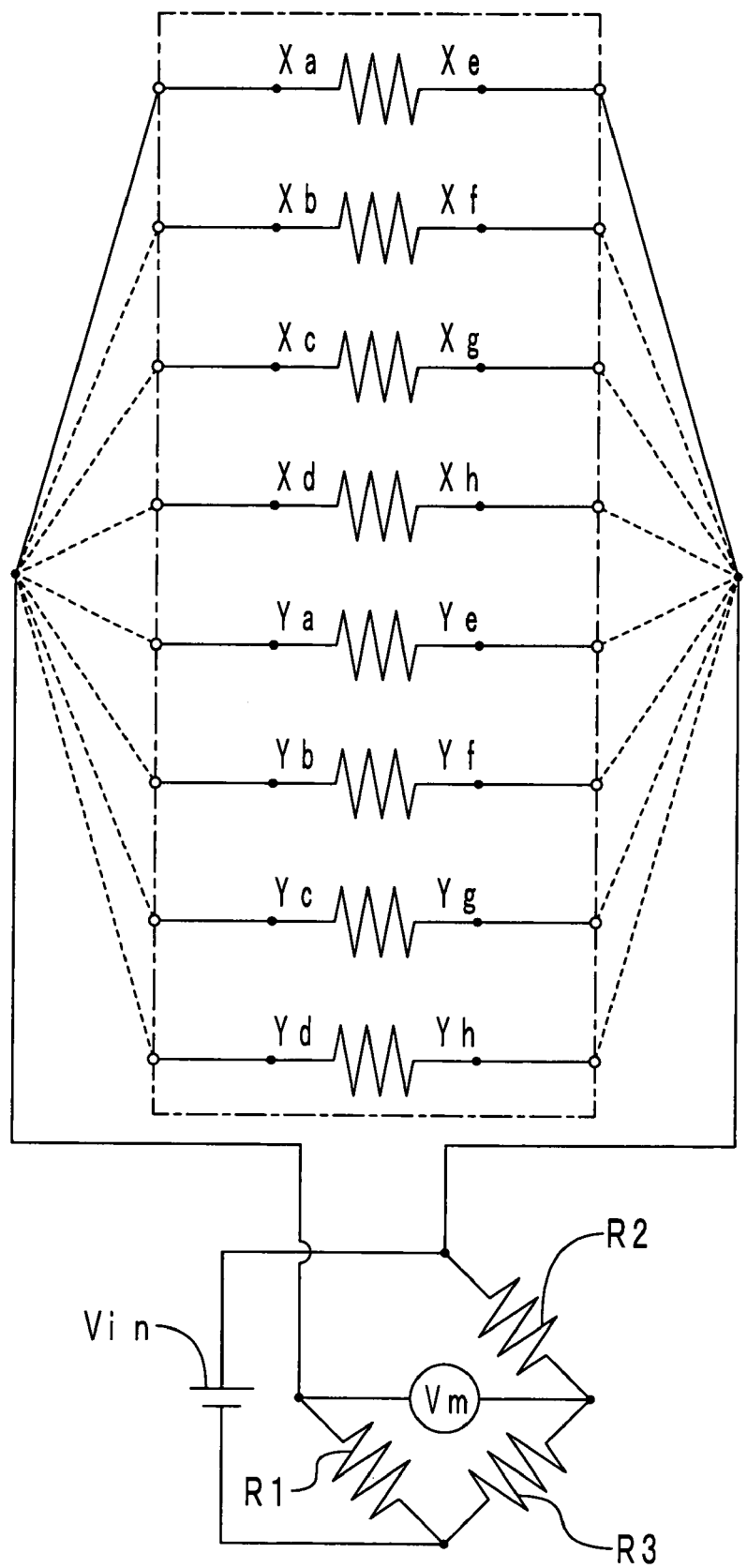
FIG. 14 is a pattern diagram of a circuit into which the deformation sensor is incorporated.

FIG. 14 is a pattern diagram of a circuit into which the deformation sensor of the fourth embodiment is incorporated. Portions corresponding to those in FIG. 6 are indicated as the same symbols. As shown in FIG. 14, the electrodes Xa and Xe, the electrodes Xb and Xf, the electrodes Xc and Xg, the electrodes Xd and Xh, the electrodes Ya and Ye, the electrodes Yb and Yf, the electrodes Yc and Yg and the electrodes Yd and Yh are switched so as to be sequentially connected to the Wheatstone bridge circuit. For this reason, changes in the electric resistances between the above electrodes are repeatedly output.

As shown by dotted line hatching in FIG. 13 as one example, when a load is applied to a part of the main body of sensor 21 from a sheet front side, that portion of the main body of sensor 21 is elastically deformed so as to subduct to a sheet rear side. For this reason, the electric resistances between the electrodes Xb and Xf and between the electrodes Yb and Yf become large. Load distribution in the area where the deformation sensor 2 is arranged can be detected.

The deformation sensor 2 of the fourth embodiment has the same action and effect as those of the deformation sensor of the first preferred embodiment. Furthermore, according to the deformation sensor 2 of the fourth embodiment, a position to which the load is applied and scale of the load can be determined precisely based on the changes in the electric resistances. According to the deformation sensor 2 of the fourth embodiment, the electrodes Xa to Xh, and Ya to Yh are arranged on an outer periphery (four sides) of the main body of sensor 21. That is to say, since the electrodes are not arranged on an area to which the load is applied, durability of the deformation sensor 2 in the fourth embodiment is high.

(5) Others

The deformation sensor according to the embodiments of the present invention is described above. The deformation sensor of the present invention is not limited to the above embodiments. The present invention can be embodied in various modified forms and improved forms which can be made by a person skilled in the art.

Figure 15:
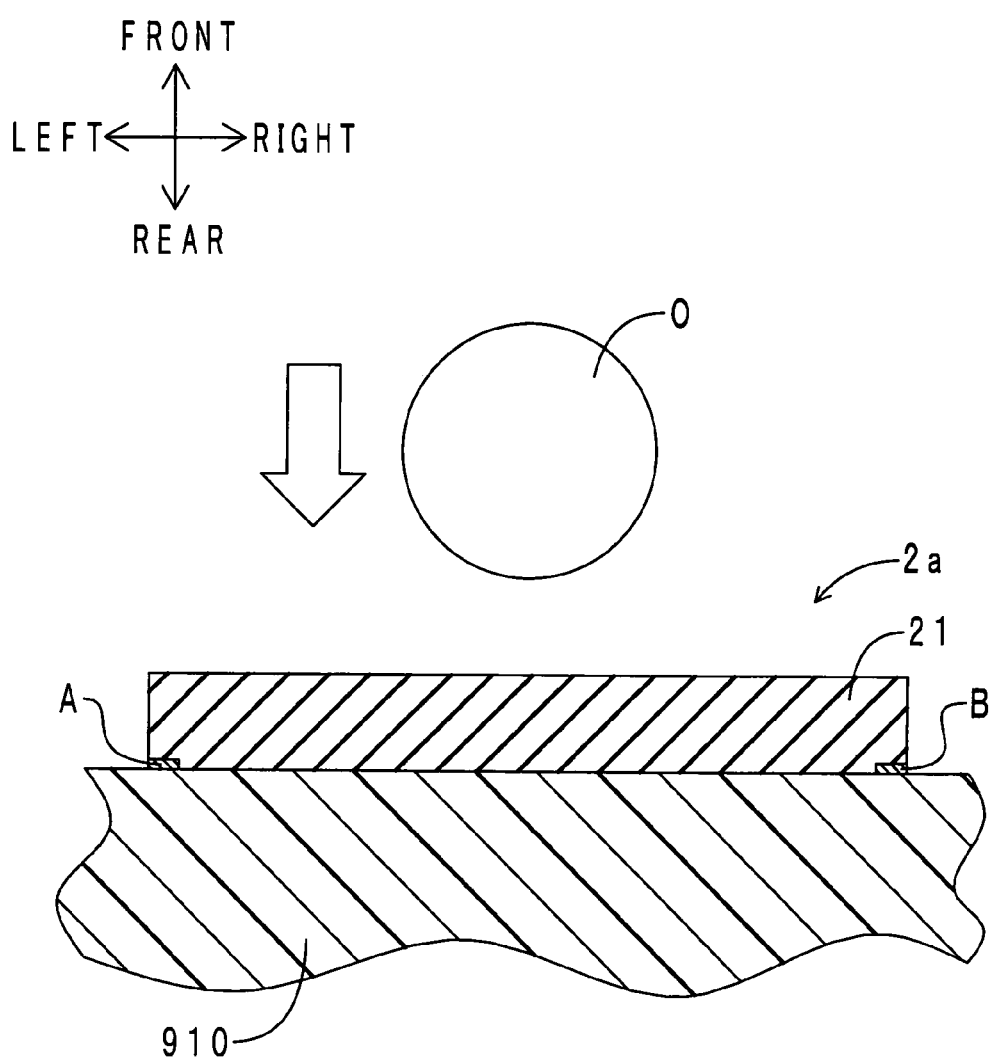
FIG. 15 is a cross-section view when viewed from a deformation sensor according to another embodiment of the present invention (before crash).

For example, in the above embodiments, the deformation sensor of the present invention is used for indirectly detecting the load, but may be used for directly detecting the load. FIG. 15 is a cross-section view when viewed from above the deformation sensor capable of directly detecting the load (the before-crash state). Portions corresponding to those in FIG. 7 are indicated as the same symbols.

Figure 16:
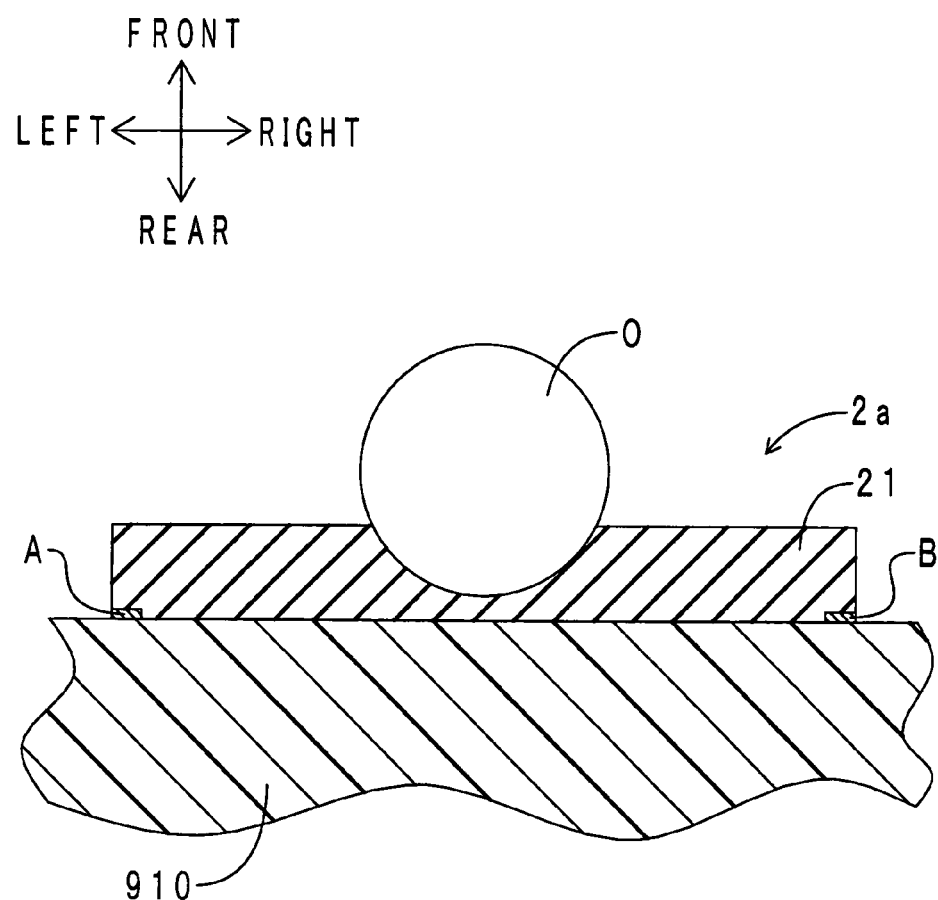
FIG. 16 is a cross-section view when viewed from the deformation sensor (after crash).

As shown in FIG. 15, the deformation sensor 2a has the main body of sensor 21, the electrodes A and B, and the base material 910. The main body of sensor 21 is fixed to the front surface of the base material 910. In this context, the base material 910 is included in the restraining component of the present invention. The deformation sensor 2a is arranged directly on a position where the object to crash O crashes against the main body of sensor 21. FIG. 16 is a cross-section view when viewed from above the deformation sensor after crash. As shown in FIG. 16, when the object to crash O crashes, the front surface (front surface of the main body of sensor 21) of the deformation sensor 2a subsides, and the main body of sensor 21 is compressed and deformed. For this reason, the electric resistance between the electrodes A and B changes. Presence/non-presence of crash, and the load can be detected based on the change of the electric resistance. For example, the load may be input from the object to crash O directly to the deformation sensor 2a without the base material 900 and the base material film 200, as shown in FIG. 8. In the deformation sensor 2a, the main body of sensor 21 is fixed directly to the front surface of the base material 910. The base material 910 on which the main body of sensor 21 is arranged may be used as the restraining component.

As shown in FIG. 15, when the main body of sensor is exposed outside, a weather-proof cover may be arranged so as to cover at least a part of the main body of sensor. This suppresses deterioration of the main body of sensor, and improves the durability.

In the above embodiments, the base material film and the restraining film section (restraining component) or the like are made of polyimide (PI). The polyimide has a high insulating property and is used a lot for FPC (flexible print circuit board) or the like. However, the material of the restraining component is not limited to this. Examples of the restraining component are resin films of polyethylene (PE), polyethylene terephthalate (PET) or the like, and a metal plate such as high damping steel. The base material film which fixes the main body of sensor may be a single layer like the above embodiments, or may be a multiple layer obtained by laminating a plurality of films.

The electrodes and the main body of sensor may be bonded by cure adhesion. As a result, the electrodes can be arranged simultaneously with the vulcanization of the main body of sensor. The method for detecting the electric resistance is not particularly limited. Temperature may be compensated or a signal may be amplified suitably.

The deformation sensor of the present invention can be applied to various applications such as a vehicle crash detecting sensor, a crew detecting sensor, an artificial skin touch sensor, a human body's joint sensor, abed surface pressure distribution sensor, a drawing tablet sensor, and a window glass breakage detecting sensor.

EXAMPLES

Response experiments conducted on the deformation sensor of the present invention are described below.

(1) Change of Electric Resistance According to Periodic Bend Deformation

<Sample>

In the experiment, a sample having the same constitution as that of the deformation sensor 2 (see FIGS. 9 and 10) according to the above second embodiment is used. That is to say, the sample (deformation sensor) 2 has the electrode film section 20 and the main body of sensor 21, and its entire shape is a band shape. The main body of sensor 21 is produced in the following procedures.

First, 85 parts by weight (hereinafter, referred to as "parts" for short) (85 g) of an oil extension EPDM ("ESPRENE® 6101" manufactured by Sumitomo Chemical Co., Ltd.), 34 parts (34 g) of an oil extension EPDM ("ESPRENE 601" manufactured by Sumitomo Chemical Co., Ltd.), 30 parts (30 g) of EPDM ("ESPRENE 505" manufactured by Sumitomo Chemical Co., Ltd.), 5 parts (5 g) of two kinds of zinc oxide (manufactured by Hakusui Chemical Industry Co., Ltd.), 1 parts (1 g) of stearic acid ("LUNAC® S30" manufactured by Kao Corporation) and 20 parts (20 g) of a paraffinic process oil (SUNPAR® 110 manufactured by Japan Sun Oil Company, Ltd.) were kneaded by a roll kneader. Next, 270 parts (270 g) of carbon beads ("NICABEADS ICB0520" manufactured by Nippon Carbon Co., Ltd.; an average particle diameter is approximately 5 μm, D90/D10=3.2 in a particle size distribution) was added, and mixed by the roll kneader to be dispersed. Furthermore, as a vulcanization accelerator, 1.5 parts (1.5 g) of zinc dimethyldithiocarbamate ("NOCCELER® PZ-P" manufactured by Ouchi Shinko Chemical Industrial Co., Ltd.), 1.5 parts (1.5 g) of tetramethyl thiram disulfide ("SANCELER® TT-G" manufactured by SANSHIN CHEMICAL INDUSTRY CO., LTD.), 0.5 parts (0.5 g) of 2-mercapto benzothiazole ("NOCCELERM-P" manufactured by Ouchi Shinko Chemical Industrial Co., Ltd.) and 0.56 parts (0.56 g) of sulfur ("SULFAX T-10" manufactured by Tsurumi Chemical Industry Co., Ltd.) were added, and mixed in the roll kneader to be dispersed. Then, an elastomer composition was prepared.

The volume fraction of the carbon beads in the prepared elastomer composition is approximately 48 vol % when a total volume of the elastomer composition is 100 vol %. Furthermore, the critical volume fraction ($\phi c$) of the elastomer composition in a percolation curve is approximately 43 vol %, and the saturated volume fraction ($\phi s$) is approximately 48 vol %. Moreover, when the elastomer composition was dissolved into a solvent (toluene) and the solvent insoluble was measured, the gel fraction is approximately 3%.

Then, the elastomer composition was formed into a band shape of predetermined size so that a compact is formed. A metal mold was filled with the compact, and an electrode was arranged on a predetermined position. Then, a press vulcanization was carried out at 170° C. for 30 minutes to obtain a main body of sensor 21. The filling rate of the carbon beads in the obtained main body of sensor 21 is approximately 48 vol % when a total volume of the main body of sensor 21 is 100 vol %.

Four kinds of samples with different lengths are used in the experiment. That is to say, the sample of the main body of sensor 21 with thickness of 2 mm, width of 10 mm and length of 50 mm is an example 1, and the sample with the same thickness and width as those in the example 1 and with length of 100 mm is an example 2. The sample with the same thickness and width as those in the example 1 and with length of 150 mm is an example 3, and the sample with the same thickness and width as those in the example 1 and length of 300 mm is an example 4.

In the samples of the examples 1 to 3, the electrodes A and B are arranged on both ends of the main body of sensor 21 in the longitudinal direction, respectively. In the sample of the example 4, besides the electrodes A and B on both the ends in the longitudinal direction, five electrodes C, D, E, F and G are arranged in the longitudinal direction at equal intervals. That is to say, the seven electrodes A to G are arranged on the sample of the example 4 so that a distance between the adjacent electrodes is 50 mm.

<Experiment Apparatus and Experiment Method>

Figure 17:
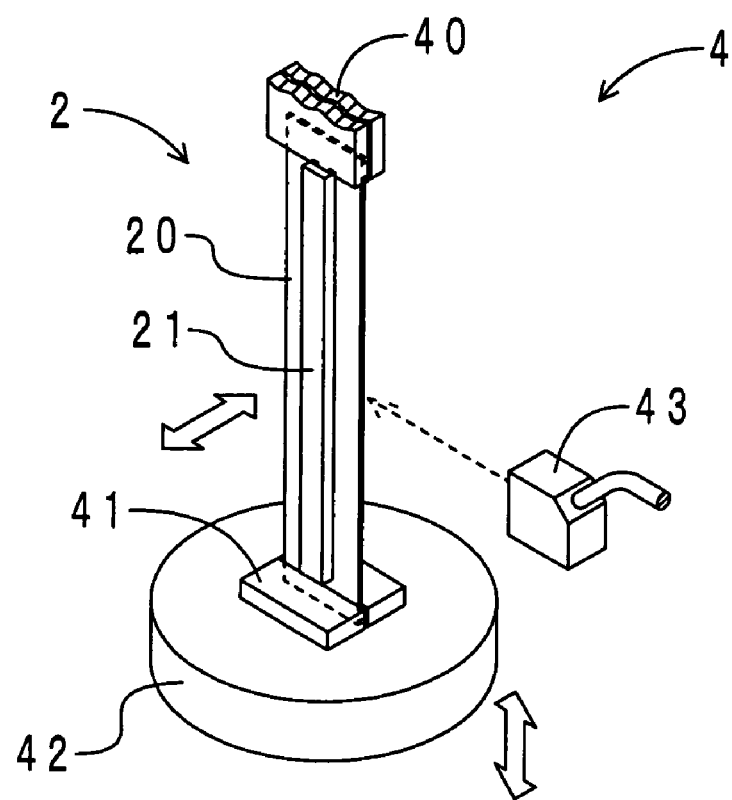
FIG. 17 is a pattern diagram for showing an experiment apparatus according to an example.

FIG. 17 is a pattern diagram for showing an experiment apparatus. As shown in FIG. 17, the experiment apparatus 4 has an upper end holder 40, a lower end holder 41, a vibration jig 42, and a laser displacement sensor 43. The upper end holder 40 is unmovable, and grips one end (upper end) of the sample (deformation sensor) 2 in the longitudinal direction. The lower end holder 41 is arranged so as to be separated downward from the upper end holder 40. The lower end holder 41 is fixed to the vibration jig 42. The vibration jig 42 can be repeatedly moved to an up-down direction. The lower end holder 41 grips the other end (lower end) of the sample 2 in the longitudinal direction.

When the vibration jig 42 is moved to the up-down direction, the interval between the upper holder 40 and the lower end holder 41 contracts and is enlarged. As a result, the sample 2 is curved. The deformation of the sample 2 is measured by the laser displacement sensor 43. The electric resistance of the sample 2 is output from the electrodes A and B to an external circuit (not shown). The samples of the examples 1 to 4 are periodically bent (vibration frequency: 1 Hz, 3 Hz), and a change of the electric resistance is measured.

Figure 18:
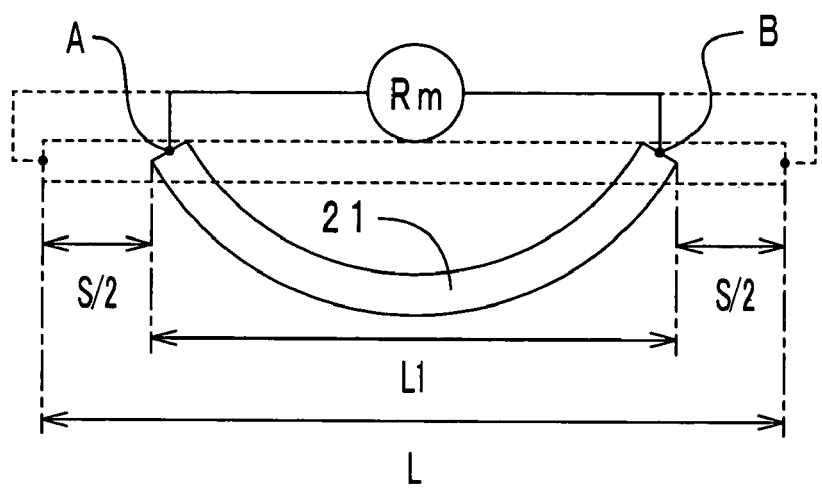
FIG. 18 is diagram for showing a method for defining a curvature in an experiment.

FIG. 18 shows a method for defining a curvature in this experiment. As shown in FIG. 18, a length in a linear state (dotted line) of the main body of sensor 21 is designated by L, a projected length of the linear state in a curved state (solid line) is designated by L1, and a difference between L and L1 is a bend-strain distance S. The curvature (%) is defined as S (mm)/L1 (mm)×100.

<Experiment Results>

Figure 19:
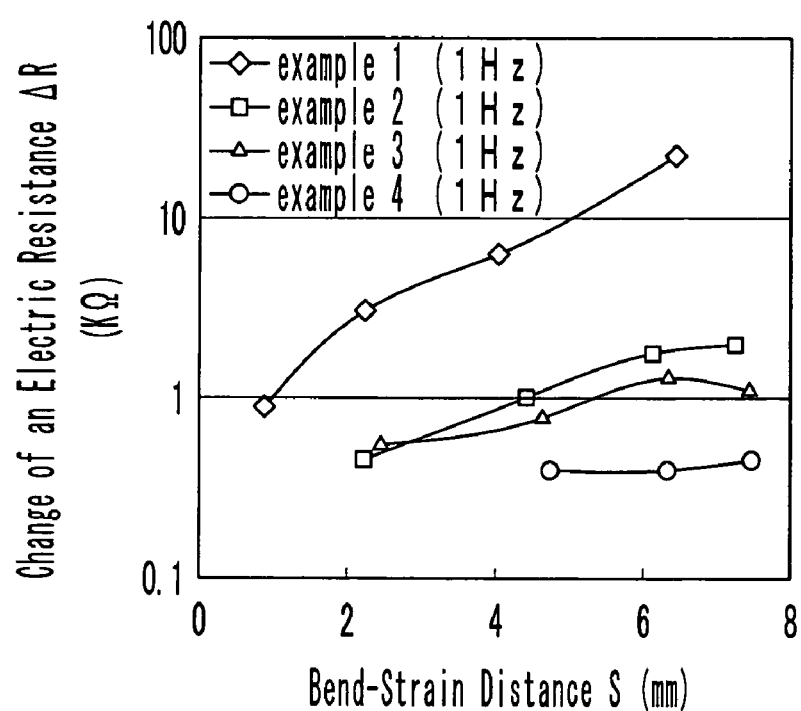
FIG. 19 is a graph for showing a change of an electric resistance according to a bend-strain distance in each sample.
Figure 20:
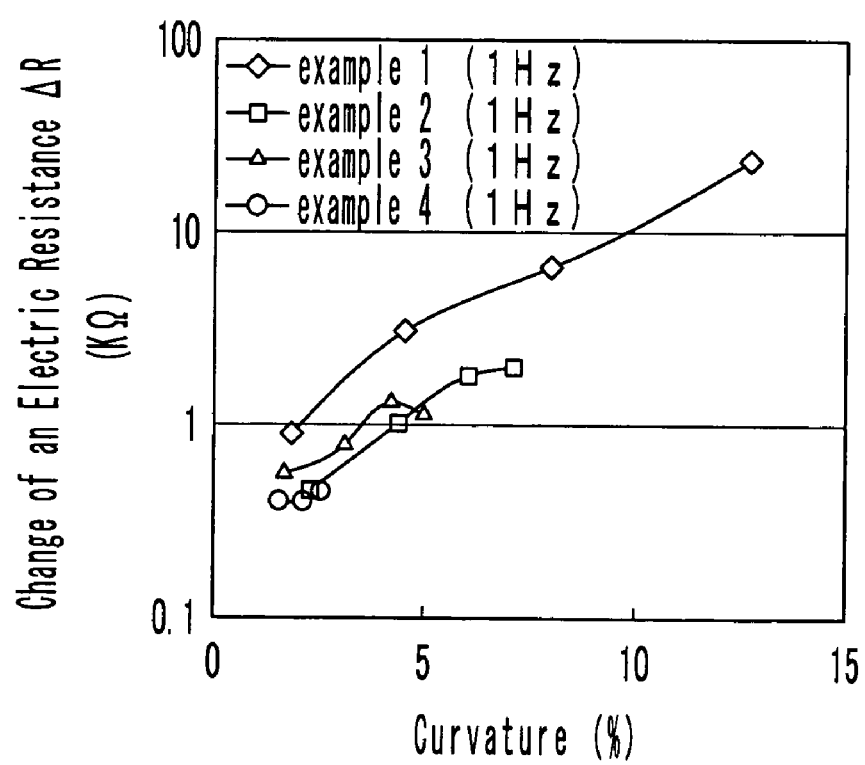
FIG. 20 is a graph for showing a change of an electric resistance according to the curvature in each sample.
Figure 21:
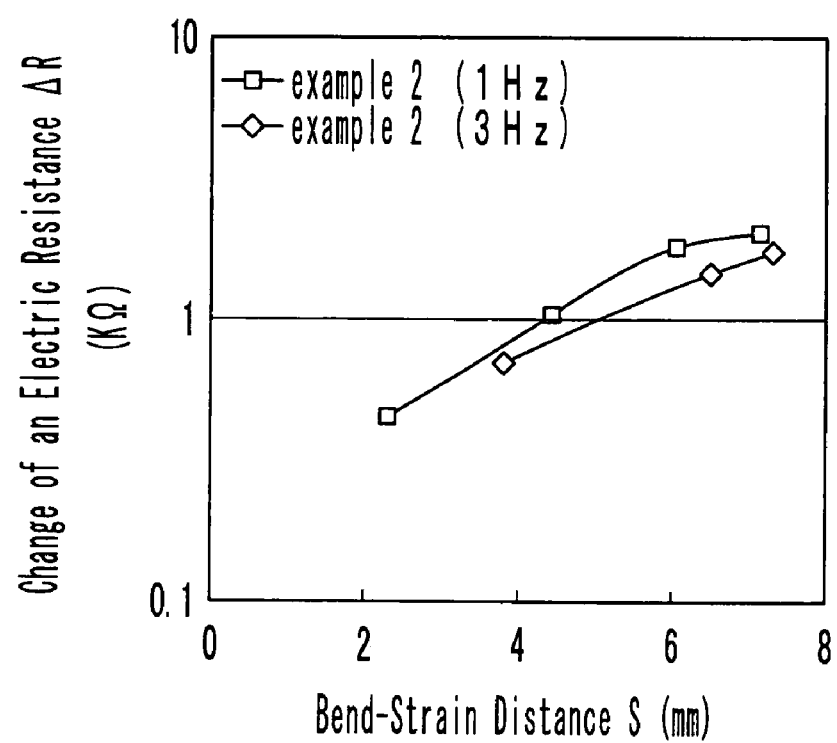
FIG. 21 is a graph for showing a change of an electric resistance according to a bend-strain distance in the case where an vibration frequency is varied.

The experiment results are shown in FIGS. 19 to 21. FIG. 19 shows a change of an electric resistance ($\Delta R$) according to a bend-strain distance (S) in each sample. As shown in FIG. 19, in any samples, the electric resistance increases due to the bending deformation. FIG. 20 shows a change of an electric resistance ($\Delta R$) according to a curvature in each sample. As shown in FIG. 20, in any samples the curvature is large, namely, as the curve deformation is larger, the change of the electric resistance becomes larger. The sample of the example 2 is bent with the vibration frequency being varied, and the change of the electric resistance is measured. FIG. 21 shows a change of an electric resistance ($\Delta R$) according to a bend-strain distance (S) in the case where the vibration frequency is varied. As shown in FIG. 21, even if the vibration frequency is varied, the change of the electric resistance is almost uniform.

(2) Evaluation of Impact Response

<Experiment Apparatus and Experiment Method>

Figure 22:
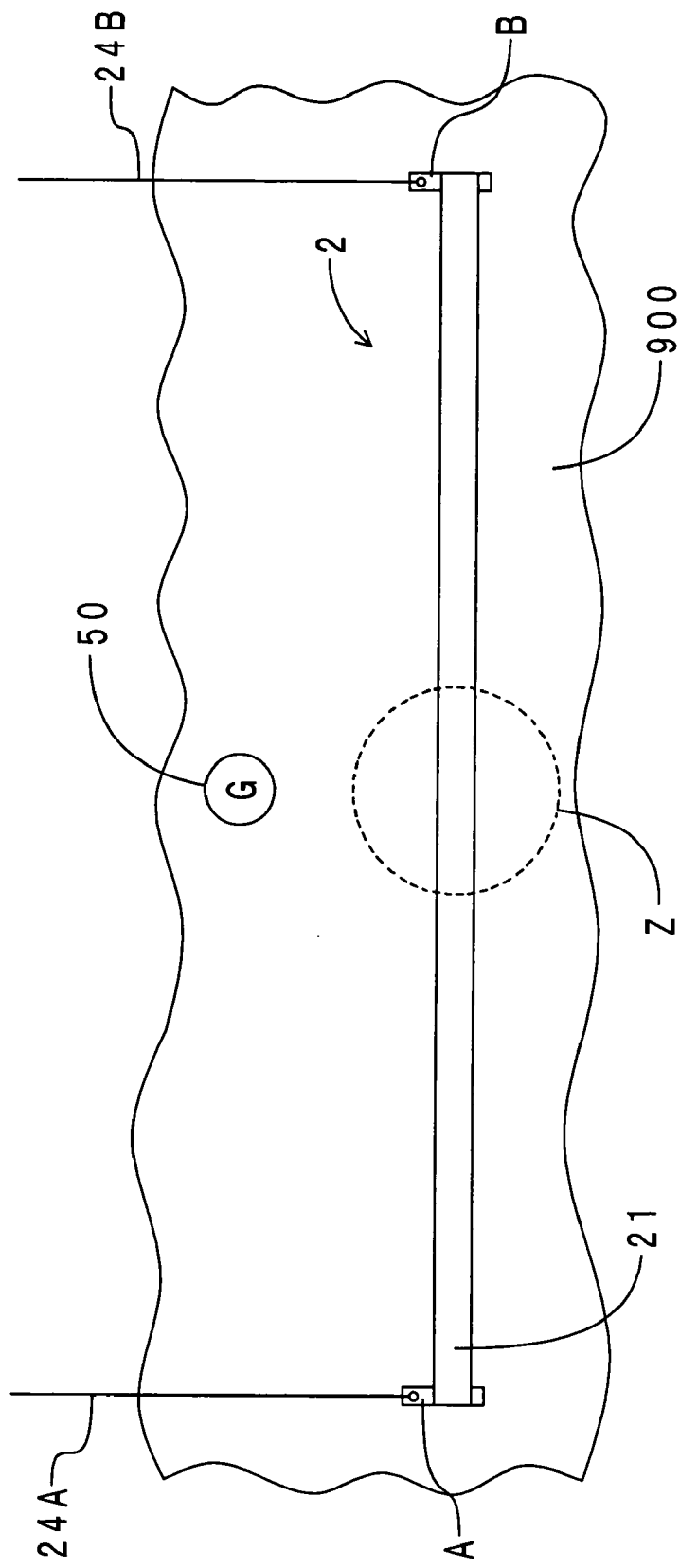
FIG. 22 is an arrangement diagram of the deformation sensor according to the example.

In the experiment, the main body of sensor 21 produced in the experiment (1) (thickness: 2 mm, width: 5 mm, length: 100 mm) is used. The main body of sensor 21 is mounted to the rear surface of the base material so that the deformation sensor is constituted, and the responsiveness of the deformation sensor to the impact from the surface of the base material is evaluated. FIG. 22 is an arrangement diagram of the deformation sensor.

As shown in FIG. 22, the deformation sensor 2 has the main body of sensor 21, the electrodes A and B, and the base material 900. The main body of sensor 21 is fixed to the rear surface of the base material 900. The contact surface of the main body of sensor 21 with the base material 900 is an input surface into which the load is input. In this experiment, the base material 900 is included in the restraining component of the present invention. The electrode A is mounted to the left end of the main body of sensor 21, and the electrode B is mounted to the right end of the main body of sensor 21. The main body of sensor 21 is connected to the external circuit (not shown, see FIG. 6) via the electrode A, the conductive wire 24A, the electrode B and the conductive wire 24B. An acceleration sensor 50 is arranged on the rear surface of the base material 900. The acceleration sensor 50 is arranged near a center of the deformation sensor 2 in the longitudinal direction so as to be separated from the deformation sensor 2.

When a impact is applied to the base material 900 from a sheet rear surface side of a sheet, the base material 900 is deformed, and accordingly the deformation sensor 2 is deformed. The deformation of the deformation sensor 2 is measured by the laser displacement sensor (not shown). The electric resistance value of the deformation sensor 2 is output from the electrodes A and B to the external circuit (not shown). The magnitude of acceleration at impact is measured by the acceleration sensor 50.

Two kinds of experiments are conducted in the following procedures. In the first experiment, a impact is applied to the surface of the base material 900 (the rear surface side of the sheet) by hitting it with a fist (high-speed impact). In the drawing, a impact input position is designated by a dotted line circle Z. At this time, the magnitude of acceleration at impact, the displacement of the deformation sensor 2 due to the impact, and the electric resistance value are measured. In the second experiment, an impact is applied to the surface of the base material 900 (the rear surface side of the sheet) by pressurizing it with a palm (low-speed impact). The impact input position is similar to the above one. At this time, the magnitude of acceleration at impact, the displacement of the deformation sensor 2 due to the impact, and the electric resistance value are measured.

<Experiment Results>

Figure 23:
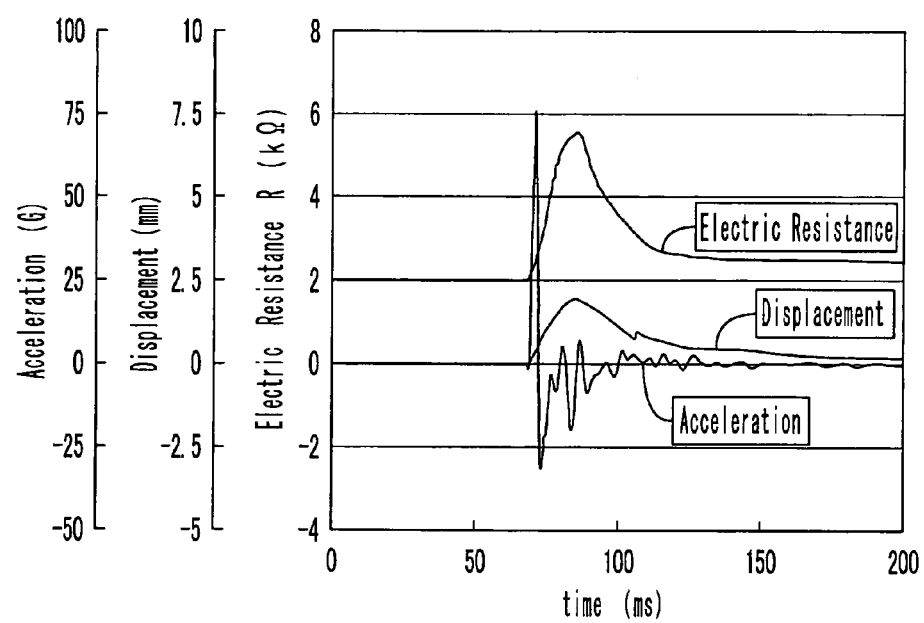
FIG. 23 is a graph for showing a change over time of an acceleration of a high-speed impact, a displacement of the deformation sensor and an electric resistance value.
Figure 24:
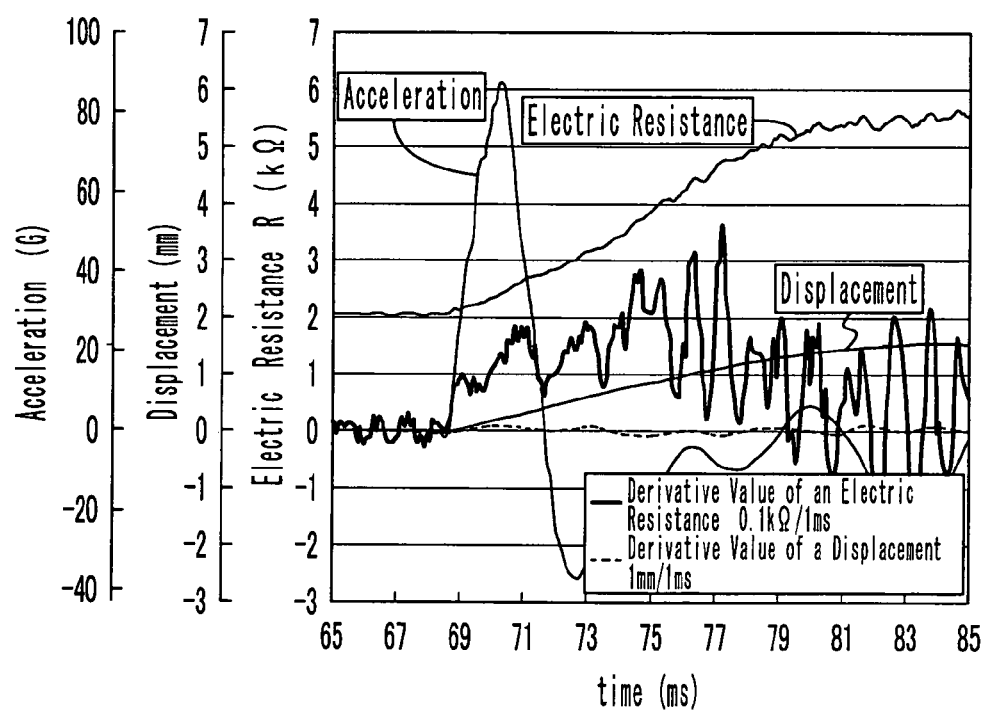
FIG. 24 is a graph for showing an enlargement of a horizontal axis (time: 65-85 ms) of FIG. 23.
Figure 25:
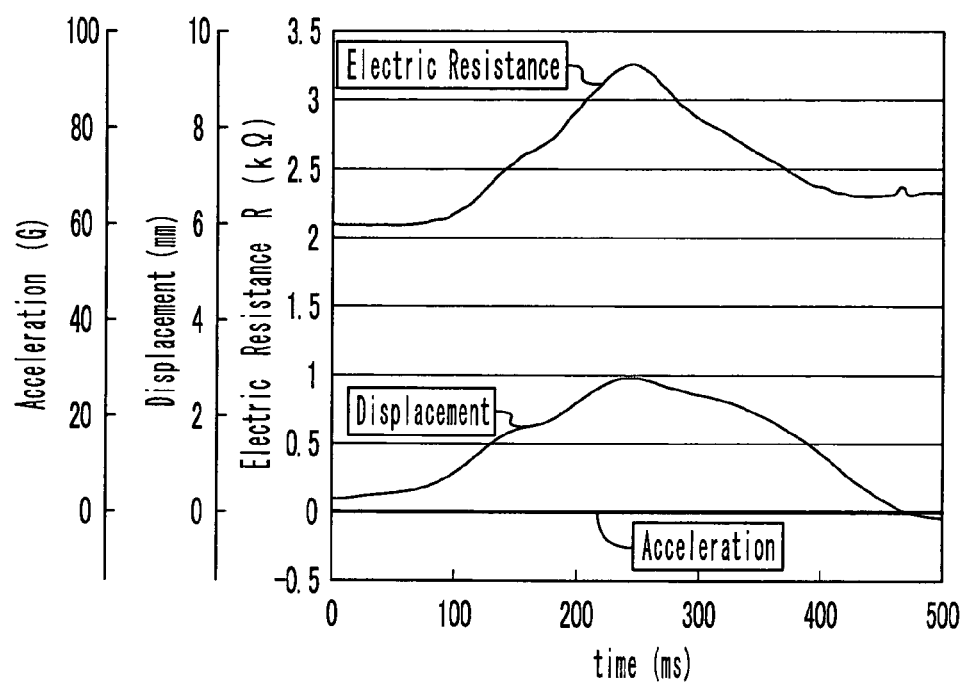
FIG. 25 is a graph for showing a change over time of an acceleration of a low-speed impact, a displacement of the deformation sensor and an electric resistance value.

The experiment results are shown in FIGS. 23 to 25. FIG. 23 shows a change over time of an acceleration of a high-speed impact, a displacement of the deformation sensor and an electric resistance value. FIG. 24 shows an enlargement of a horizontal axis (time: 65-85 ms) of FIG. 23. As shown in FIGS. 23 and 24, the electric resistance value of the deformation sensor promptly increases according to the high-speed impact. The responsiveness of the deformation sensor of the present invention is high. The electric resistance value changes in proportional to the bending deformation of the deformation sensor. That is to say, the deformation sensor of the present invention can directly detect the bending deformation.

FIG. 25 shows a change over time of an acceleration of a low-speed impact, a displacement of the deformation sensor and an electric resistance value in the second experiment. As shown in FIG. 25, in the case of the low-speed impact at the time of pressuring with a palm, the acceleration is not generated. The electric resistance value, however, changes in proportional to the bending deformation of the deformation sensor. The deformation sensor of the present invention can detect the bending deformation even in the case of the low-speed impact.

What is claimed is:

1. A deformation sensor comprising:
   an elastically deformable main body of the sensor comprising an elastomer and spherical conductive fillers blended into the elastomer at a high filling rate in an approximately single-particle state, and having an electric resistance that increases as an elastic deformation increases,
   an electrode that is connected to the main body of the sensor and can output the electric resistance; and
   a restraining component that restrains the elastic deformation of at least a portion of the main body of the sensor.

2. The deformation sensor according to claim 1, wherein the main body of the sensor is composed of an elastomer composition consisting essentially of the elastomer and the conductive fillers, and wherein
   in a percolation curve which expresses a relationship between a blending amount of the conductive fillers and the electric resistance of the elastomer composition, the blending amount of the conductive fillers at a second polarity change point at which a change of the electric resistance is saturated (saturation volume fraction: $\phi s$) is not less than 35 vol %.

3. The deformation sensor according to claim 1, wherein the filling rate of the conductive fillers is not less than 30 vol % to not more than 65 vol % in the case where a total volume of the main body of the sensor is 100 vol %.

4. The deformation sensor according to claim 1, wherein the conductive fillers are carbon beads.

5. The deformation sensor according to claim 1, wherein an average particle diameter of the conductive fillers is not less than 0.05 μm to not more than 100 μm.

6. The deformation sensor according to claim 1, wherein the elastomer includes at least one rubber selected from the group consisting of silicone rubber, ethylene-propylene copolymer rubber, natural rubber, styrene-butadiene copolymer rubber, acrylonitrile-butadiene copolymer rubber and acrylic rubber.

7. The deformation sensor according to claim 1, wherein the main body of the sensor is elastically bending deformable.

8. The deformation sensor according to claim 7, wherein the main body of the sensor has an input surface into which a load is input from the outside, and an anti-input surface opposite to the input surface at a back side, and
   the restraining component that restrains elastic deformation on at least one of the input surface and the anti-input surface is arranged on at least one of the input surface and the anti-input surface to be restrained.

9. The deformation sensor according to claim 1, wherein the main body of the sensor has a long shape, and
   the plurality of electrodes are arranged along a longitudinal direction of the main body of the sensor.

10. The deformation sensor according to claim 1, wherein the main body of the sensor has a flat-plate shape, and
   at least two or more pairs of electrodes, wherein the two electrodes of each pair of electrodes are opposite to each other, and are arranged on a peripheral edge of the main body of the sensor.

* * * * *